US006754814B1

(12) United States Patent
Narita et al.

(10) Patent No.: US 6,754,814 B1
(45) Date of Patent: Jun. 22, 2004

(54) INSTRUCTION PROCESSING APPARATUS USING A MICROPROGRAM THAT IMPLEMENTS A RE-READING OPERATION BY CONTROLLING EARLY LOADING OF INSTRUCTIONS

(75) Inventors: Hiroki Narita, Kawasaki (JP); Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/461,424

(22) Filed: Dec. 16, 1999

(30) Foreign Application Priority Data

Dec. 17, 1998 (JP) ............................................ 10-359498

(51) Int. Cl.[7] ................................................ G06F 9/00
(52) U.S. Cl. ..................................................... 712/245
(58) Field of Search .......................... 712/245, 39, 40, 712/219, 229, 244–248

(56) References Cited

U.S. PATENT DOCUMENTS

| | | | |
|---|---|---|---|
| 4,635,194 A | | 1/1987 | Burger et al. |
| 4,777,594 A | * | 10/1988 | Jones et al. .................. 712/240 |
| 5,473,767 A | * | 12/1995 | Kardach et al. ............. 713/600 |
| 5,724,566 A | * | 3/1998 | Swoboda et al. ........... 712/205 |
| 5,918,043 A | * | 6/1999 | Kardach et al. ............. 713/601 |

FOREIGN PATENT DOCUMENTS

| | | |
|---|---|---|
| JP | 57-8852 | 1/1982 |
| JP | 59-202544 | 11/1984 |
| JP | 60-171538 | 9/1985 |

OTHER PUBLICATIONS

Vincent P. Heuring and Harry F. Jordan; Computer Systems Design and Architecture; Jan. 1997; Addison Wesley; 145, 226, 229–245, 394.*
John L. Henessy and David A. Patterson; Computer Organization and Design; Sep. 1997; Morgan Kaufman Publishers, Inc.; C.21–27.*
"Asynchronous Pipelined Instruction Prefetch Mechanism", Feb. 1983, IBM Technical Disclosure Bulletin, vol. 25, Issue 9, pp. 4722–4727.*

* cited by examiner

Primary Examiner—David Wiley
Assistant Examiner—Scott M. Collins
(74) Attorney, Agent, or Firm—Staas & Halsey LLP

(57) ABSTRACT

An instruction processing apparatus using a microprogram instruction which implements re-reading operation. The instruction execution apparatus is provided with a queue stack, a unit halting requests for reading subsequent instructions at the instruction of a microprogram, and a unit releasing this halt. Further, by instruction the reading of the subsequent instructions using the microprogram control information, it becomes possible to simultaneously execute the microprogram and instruction re-reading processing. Because the Program Status Word Instruction Address (PSWIAR) of the load control (LCTL) plus the instruction length of the PSWIAR makes an instruction fetch address of the LCTL, the hardware of the instruction re-read address production circuit (which is a part of the instruction processing circuit) can be used. This reduces the: T-cycle instruction address register (TIAR), T-cycle instruction length code (TILC), A-cycle instruction address register (AIAR), the A-cycle instruction length code (AILC), and an adder for adding the TILC with the TIAR.

4 Claims, 35 Drawing Sheets

INSTRUCTION RE-READING ROUTINE USING MICROPROGRAM

INSTRUCTION RE-READING ROUTINE USING MICROPROGRAM

D-CONTROL SIGNAL

T-CONTROL SIGNAL

PROCESS CONTROL UNIT

Fig.22
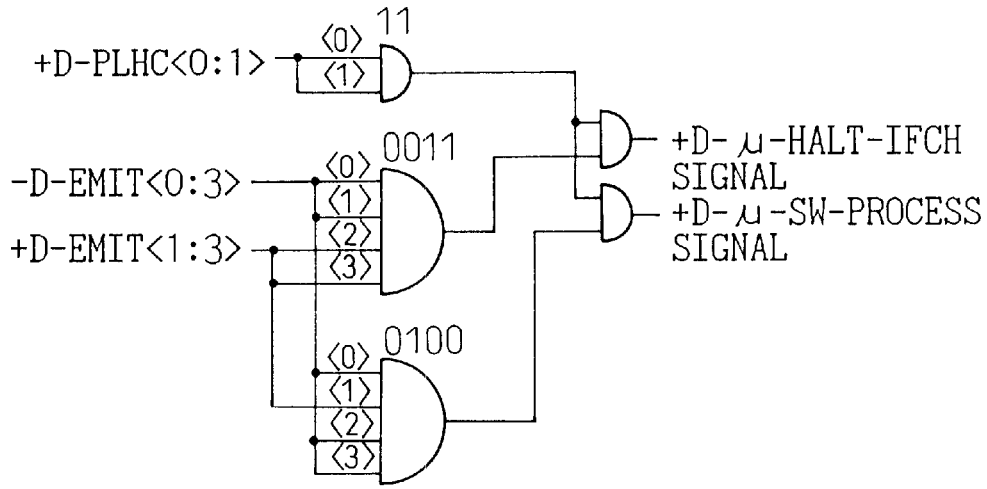
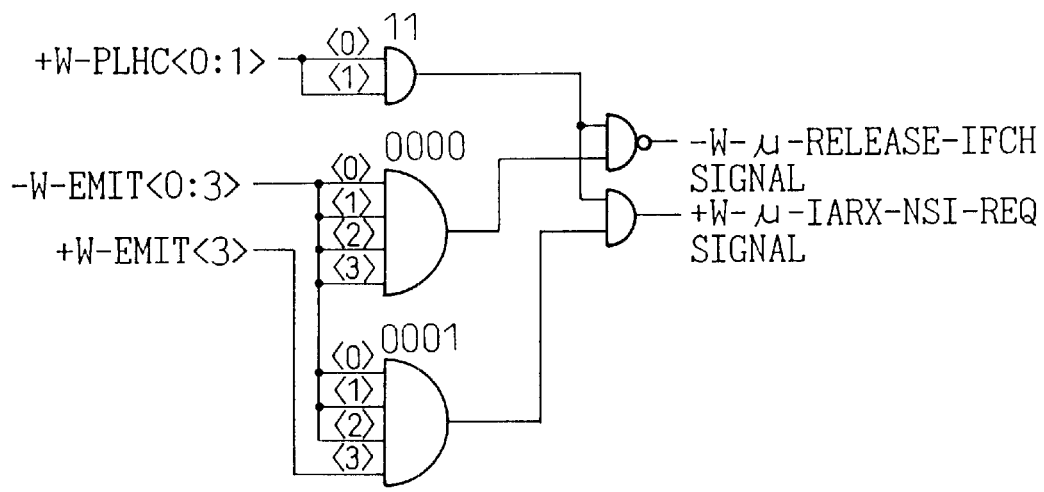
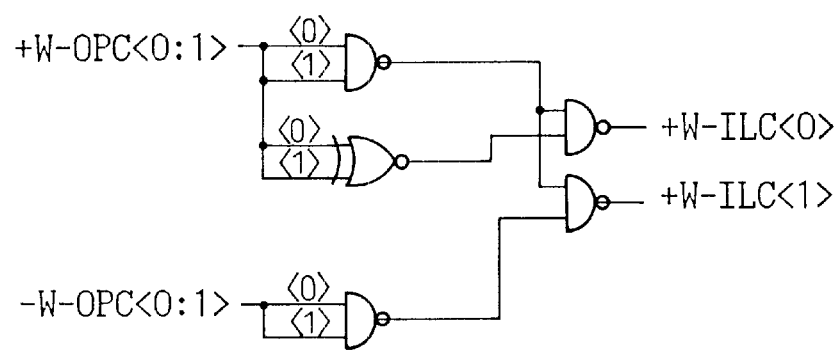

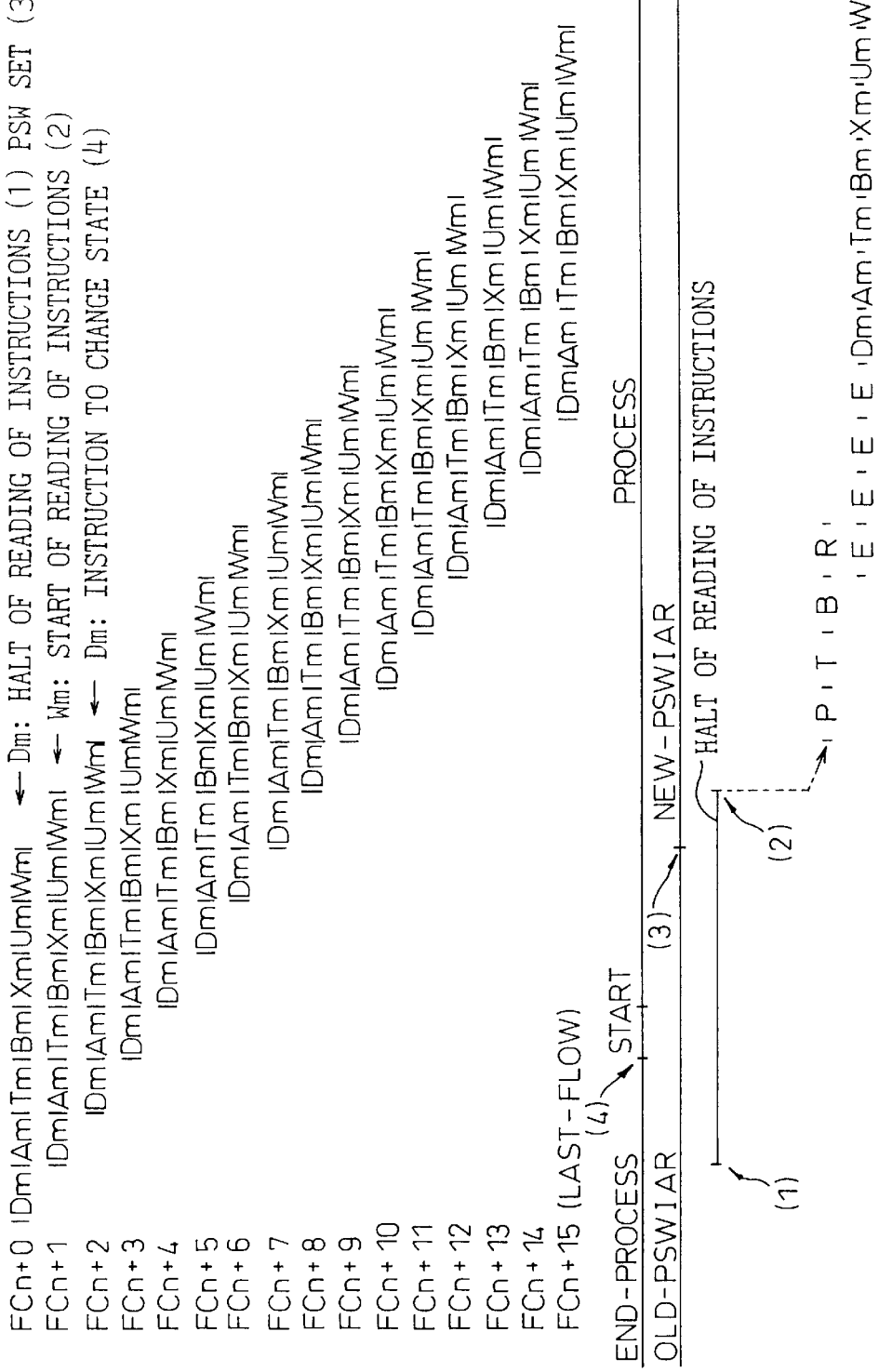

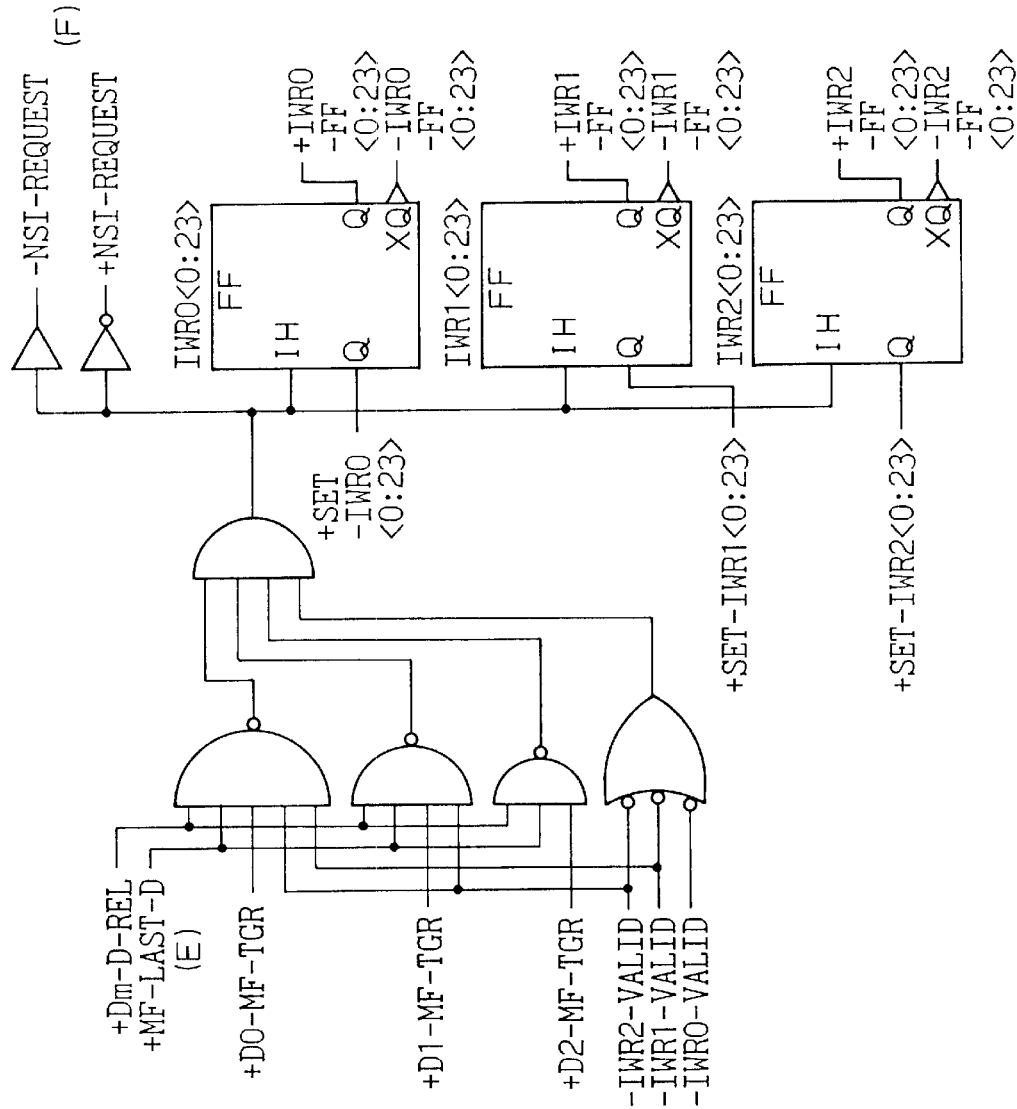

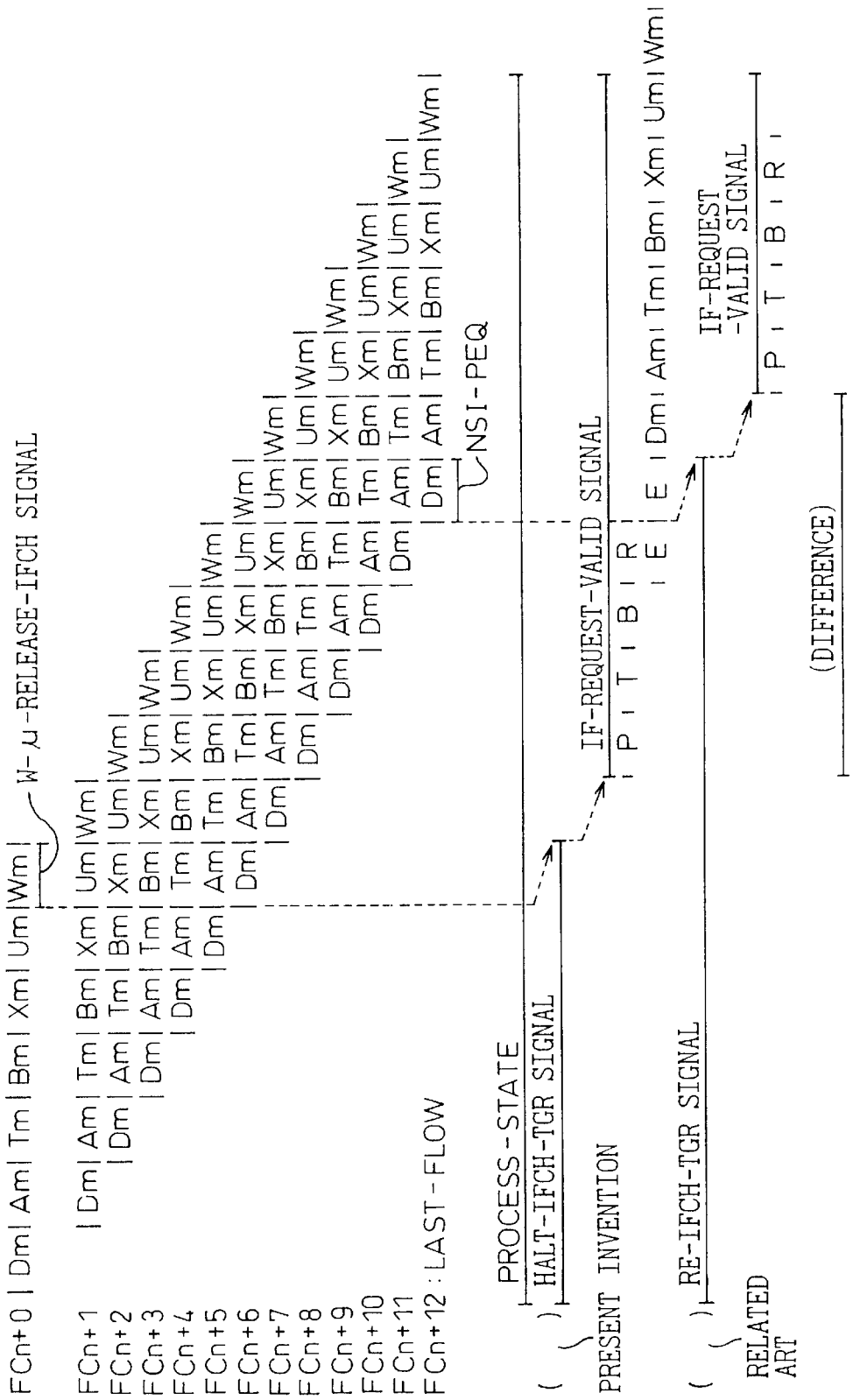
Fig. 36 FLOW CHART: EFFECT OF PRESENT INVENTION

INSTRUCTION PROCESSING APPARATUS USING A MICROPROGRAM THAT IMPLEMENTS A RE-READING OPERATION BY CONTROLLING EARLY LOADING OF INSTRUCTIONS

BACKGROUND OF THE INVENTION

1. Field of the Invention

The present invention relates to an instruction processing apparatus in an information processing system.

2. Description of the Related Art

In an information processing system, when a load control (LCTL) instruction or other instruction requiring serial processing, a load program status word (LPSW) instruction or other instruction for changing the controlled state of a system, or an interrupt is executed, instructions have to be re-read.

Recent information processing systems use a microprogram so as to execute instructions while reducing the hardware. Similar use is made of a microprogram for realizing a method for re-reading instructions due to execution of an LCTL instruction or other instruction requiring serial processing, a LPSW instruction or other instruction for changing the controlled state of a system, or an interrupt.

FIG. 1 is a flowchart of the routine for an instruction re-read operation using a microprogram.

An instruction re-read operation using a microprogram is realized by, in time, starting up the microprogram (step S1), halting the reading of instructions (step S2), setting an instruction read address (step S3), and starting the reading of instructions (step S4).

A conventional instruction processing unit adopting pipeline processing performs similar processing to that of FIG. 1.

A conventional instruction re-read method using pipeline processing will be described next using FIG. 2 to FIG. 13. FIG. 2 to FIG. 5 show an instruction processing circuit. FIG. 2 shows the overall configuration of the circuit and the connection of FIG. 3 to FIG. 5. FIG. 6 to FIG. 8 are timing charts of instruction re-re-read processing. FIG. 9 to FIG. 13 show the hardware configuration employed in the instruction processing circuit.

A basic instruction re-read operation description follows.

The basic instruction re-read processing is performed by an LPSW instruction. Among the timing charts of FIG. 6 to FIG. 8, FIG. 6 shows the processing of this example.

The routine of FIG. 1 in an LPSW instruction as executed as follows. First, in the startup of the microprogram of step S1 of FIG. 1, instructions fetched into an instruction buffer (IBUFFER) of FIG. 3 are loaded into an instruction register (IWR), the instructions are decoded at the D-cycle, and an operation code (IO) is supplied to a control storage address register (CSAR). By this, microprogram control information (PLHC, PCR, LAST-WORD, etc.) is successively read from a main control storage (MCS) into a D-tag (DTAG). The PLHC is a Pipeline Hardware Control used for interlock controlling of the pipeline, the PCR is a Program Control Register mainly used for controlling REGISTER, and the LAST-WORD (Last-Word) contains data read from the MCS, which shows the end of the microprogram. The microprogram control information is shifted from the D-cycle to a W-Cycle for the processing at the cycles (D-Cycle to W-Cycle).

The halting of the reading of instructions at step S2 of FIG. 1 is performed by a function counter 2 (FC2) of FIG. 6. Microprogram control information (PLHC=0C) of the FC2 read from the MCS of FIG. 3 is shifted from the D-cycle to the W-cycle. At this time, the microprogram control information (PLHC=0C) from the TTAG of the T-cycle is decoded and a T-CONTROL signal (A) is produced (see FIG. 10) and sent to an instruction reading control unit of FIG. 3. For explanation, a function counter (e.g. FC2, shown in FIG. 6) indicates a count of a series of processes from D-cycle to W-cycle. The function counters FC0–FCn are not constituted by hardware, but are indications that show function units processed by the data read from the MCS in each fetch cycle.

The sent T-CONTROL signal (A) activates the RE-IFCH-TGR of FIG. 12 and halts the reading of instructions by a signal (C): +IF-REQ signal sent from the instruction reading control unit of FIG. 3 (see FIG. 12). At the same time, the instruction buffer is initialized by clearing the NSI-COUNTER of FIG. 3 showing the state of the IBUFFER and the location of instructions by a signal (D): –INITIALIZE-NSIC signal (see FIG. 12) sent from the instruction reading control unit.

The setting of the instruction read address of step S3 in FIG. 1 is performed by a function counter FC0 of FIG. 6. The microprogram control information (PCR=14) of the FC0 read from the MCS of FIG. 3 is shifted from the D-cycle to the W-cycle. At this time, an operand fetch instruction is issued by an A-CONTROL signal of the A-cycle of FIG. 4, microprogram control information (PCR=14) is decoded from the WTAG of the W-cycle of FIG. 5, a W-CONTROL signal (E) is produced (see FIG. 11), the result register latch (RR-LCH) of FIG. 5 is selected, and the output is written in a program status word (PSW).

Next, at the W+1 cycle of FIG. 5, an instruction address (PSWIAR) of the PSW updated by a W-CONTROL-LCH signal (F) latching the W-CONTROL signal (E) of FIG. 11 is loaded into an instruction address register (IAR).

The starting of reading of instructions of step S4 of FIG. 1 is performed by FC5 of FIG. 6. Microprogram control information (LAST-WORD) of the FC5 read from the MCS of FIG. 3 is shifted from the D-cycle to the W-cycle. At this time, the AND of the microprogram control information (LAST-WORD) and a D-VALID signal (signal indicating that the D-cycle is valid) is taken from the DTAG of the D-cycle of FIG. 3, whereby an NSI-REQ signal (G) is produced and sent to the instruction reading control unit of FIG. 3.

The NSI-REQ signal (G) sent to the instruction reading control unit of FIG. 3 resets the latch of RE-IFCH-TRG of FIG. 12 and then activates the latch of START-UP, whereby an IF-REQ signal (C) is sent from the next clock cycle and thereby instructions start being read.

By the processing of the microprogram as explained above, the routine of FIG. 1 is satisfied and the basic instruction re-read operation indicated in FIG. 6 is carried out.

An example of producing subsequent instruction address and performing instruction re-read operation follows. The instruction re-read operation at the subsequent instruction address is performed by the load control (LCTL) instruction. Among the timing charts of FIG. 6 to FIG. 8, FIG. 7 shows the processing of this example.

The LCTL also performs the instruction re-read operation according to the routine of FIG. 1. The startup of the microprogram for the instruction re-read operation of step S1, the halting of reading of instructions of step S2, and the starting of reading of instructions of step S4 in this example are similar to those of the above explanation of the basic instruction re-reading operation. Only the setting of the instruction read address of step S3 differs.

In the same way as the above basic instruction re-reading operation, a microprogram is started up at step S1 and the halting of the reading of instructions of step S2 is performed by the FC2 of FIG. 7.

The setting of the instruction read address of step S3 of FIG. 1 is performed by the FC6 of FIG. 7. In the same way as the microprogram control information (PLHC=0F) of the FC6 read from the MCS of FIG. 3 being shifted from the D-cycle to the W-cycle, an address in the IAR corrected by an instruction address modifier (IAM) sent from the instruction reading control unit of FIG. 3 and an instruction length code decoded from the IWR are shifted.

At this time, microprogram control information (PLHC=0F) is decoded from the TTAG of the T-cycle, a T-CONTROL signal (B) is produced (see FIG. 10), TIAR+TILC obtained by adding the data of the T-cycle instruction address register (TIAR) and the T-cycle of FIG. 4 instruction length code (TILC) is selected, and the TIAR+TILC is loaded into the IAR.

Next, for the start of the reading of instructions of step S4 of FIG. 1, processing similar to that explained in the above basic instruction re-read operation is performed by the FC8.

By the processing of the microprogram as explained above, the routine of FIG. 1 is satisfied and the basic instruction re-read operation indicated in FIG. 7 is carried out.

An Example of Performing Instruction Re-read Operation Influenced by State of CPU in Interrupt Processing follows.

Among the timing charts of FIG. 6 to FIG. 8, FIG. 8 shows the processing of this example.

In the instruction re-reading operation influenced by the state of the CPU in the interrupt processing, an instruction re-read operation is performed according to the routine of FIG. 1. The startup of the microprogram for the instruction re-read operation of step S1, the halting of reading of instructions of step S2, and the setting of the instruction read address of step S3 in this example are similar to those of the above explanation of the basic instruction re-reading operation. Only the starting of reading of instructions of step S4 differs.

In the same way as the above basic instruction re-reading operation, a microprogram is started up at step S1, the halting of the reading of instructions of step S2 is performed by the FC2 of FIG. 8, and the setting of the instruction read address of step S3 is performed by the FC0.

The starting of the reading of instructions of step S4 of FIG. 1 is performed by the FC8 of FIG. 8. Microprogram control information (LAST-WORD) of the FC8 read from the MCS is shifted from the D-cycle to the W-Cycle. At this time, the AND of the microprogram control information (LAST-WORD) and D-VALID signal (signal indicating that the D-cycle is valid) is taken from the DTAG of the D-cycle, whereby an NSI-REQ signal (G) is produced (see FIG. 9) and sent to the instruction reading control unit and process control unit of FIG. 3.

The NSI-REQ sent to the instruction reading control unit of FIG. 3 resets the latch of RE-IFCH-TGR of FIG. 12 and activates the latch of START-UP. The NSI-REQ sent to the process control unit of FIG. 3 is latched and the AND of the latched signal and an END-PROCESS-STATE signal (see FIG. 13) is taken, whereby the state is changed from a START state to a PROCESS state. When the PROCESS state is entered, the Enable Process Instruction Fetch (ENB-PROCESS-IFCH) of FIG. 12 is activated, whereby the IF-RED signal (C) is sent from the next clock cycle and thereby instructions start being read. The ENB-PROCESS-IFCH indicates that the instruction fetch process is valid.

By the processing of the microprogram as explained above, the routine of FIG. 1 is satisfied and the basic instruction re-read operation indicated in FIG. 8 is carried out.

The conventional instruction re-read method using pipeline processing explained above, however, suffered from the following three problems:

1. Calculation of Subsequent Instruction Address

In the conventional pipeline type instruction processing method, the subsequent instruction address is calculated by the T-cycle instruction address register and T-cycle instruction length code. Doing this invites an increase in the hardware, so a new method of calculating a subsequent instruction address is needed.

2. Starting of Reading of Instructions

The conventional operation for starting reading of instructions, as indicated in FIG. 6 to FIG. 8, starts the subsequent reading of instructions by the NSI-REQ signal at the D-cycle of the last cycle of the microprogram. This is due to the fact that, in the conventional control for loading instructions, as shown in FIG. 3, the initial instruction fetch data is loaded directly to the IWR without passing through the IBUFFER, therefore if reading of subsequent instructions is started during execution of a current instruction at the time of an instruction re-read operation, the content of the IWR may be destroyed.

As opposed to this, the content of the IWR will never be destroyed when the reading of subsequent instructions is started, in the D-cycle of the last cycle of a microprogram, as shown in FIG. 6 to FIG. 8. However, when the reading of instructions is started at the D-cycle of the last cycle, if the number of clock cycles for the processing for reading instructions increases due to cache errors in instruction fetching operations, conversion of instruction address, etc., the loading of instructions to the instruction execution control unit is delayed by the amount of the increase in the number of clock cycles caused by the processing for reading the instructions.

3. State Transition of CPU

In interrupt processing, starting from the D-cycle of the last cycle, the state changes from the ENDPROCESS-STATE to START and to PROCESS-STATE. The reading of instructions is first started at PROCESS-STATE. Therefore, the reading of subsequent instructions is delayed.

SUMMARY OF THE INVENTION

An object of the present invention is to establish a new method of re-reading instructions and to increase the instruction re-reading speed in an instruction re-read operation using a microprogram while decreasing the hardware. In the present invention, along with changes in the method of executing instructions, there is provided an instruction re-read operation using a microprogram which can establish a new method of rereading instructions and realize an increase in speed of the instruction re-read operation—a perennial problem in information processing systems—while reducing the hardware.

The present invention was made to achieve the above object.

The instruction processing apparatus according to the present invention provides a queue stack to execute instructions. Moreover, it employs a method under which all control for loading instructions goes through an instruction buffer (IBUFFER) and instructions are loaded into an instruction register (IWR). Due to this, it is possible to avoid the case of destruction of the content of the IWR by simple control (this is explained in the discussion below of FIGS. 33 to 35, which precedes the explanation of the overall instruction re-read operation of FIG. 20). In the processing of the microprogram for the instruction re-read operation, by performing the instruction fetching operation in advance during the execution of the microprogram, it becomes possible to load instructions in the instruction execution pipeline soon after the completion of the processing of the microprogram.

The present invention is further provided with the later explained means for the following reasons:

1. In an instruction processing apparatus, an instruction execution control unit and an instruction fetch pipeline operate mutually independently, therefore microprogram processing and instruction fetch processing can be executed simultaneously.

2. There are methods of calculating subsequent instruction addresses without calculation of the T-cycle instruction address and T-cycle instruction length code.

3. The END-PROCESS STATE is required for starting a microprogram for interrupt processing etc., but while the microprogram for interrupt processing is running, the END-PROCESS-STATE is not required.

For the reasons above, the following means are provided:

1. An instruction reading request halt control register, a halt unit halting an instruction reading request issued by a microprogram, and a halt releasing unit are provided so as to enable an instruction re-read operation.

2. The start of reading instructions of FIG. 1 is instructed by separate microprogram control information so as to enable simultaneous execution of the instruction re-reading processing with the execution of a microprogram and to enable an increase of speed of the instruction re-read operation.

3. A unit holding a self instruction address and self instruction length due to microprogram instructions in an instruction re-read operation at a subsequent instruction address and an adder are provided so as to decrease the hardware and enable the instruction re-read operation.

4. A unit causing a change in state from the ENDPROCESS-STATE through the START-STATE to the PROCESS-STATE soon due to a microprogram instruction and enabling an instruction fetching operation in an instruction re-read operation at an interrupt processing etc. is provided so as to execute the instruction re-read operation.

BRIEF DESCRIPTION OF THE DRAWINGS

The above object and features of the present invention will be more apparent from the following description of the preferred embodiments given with reference to the accompanying drawings, wherein:

FIG. 22 is a view of the hardware configuration (part 2) of a DTAG and WTAG employed in the instruction processing circuit of FIG. 14;

FIG. 34 is a timing chart indicating different operations from those of FIG. 20;

FIG. 35 is a view of the hardware configuration provided corresponding to the operation of FIG. 34; and FIG. 36 is a timing chart for comparing the present invention with the related art.

DESCRIPTION OF THE PREFERRED EMBODIMENTS

Below, an embodiment of the present invention will be described in conjunction with the drawings.

In this embodiment, instead of pipeline control of execution of conventional instruction processing, provision is made of a queue stack called a "reservation station" for control of execution of instructions so as to realize microprogram control corresponding to instruction execution control. Below, an explanation will be made of a general microprogram operation in the system of control of execution of instructions by provision of a queue stack.

Figure 14:
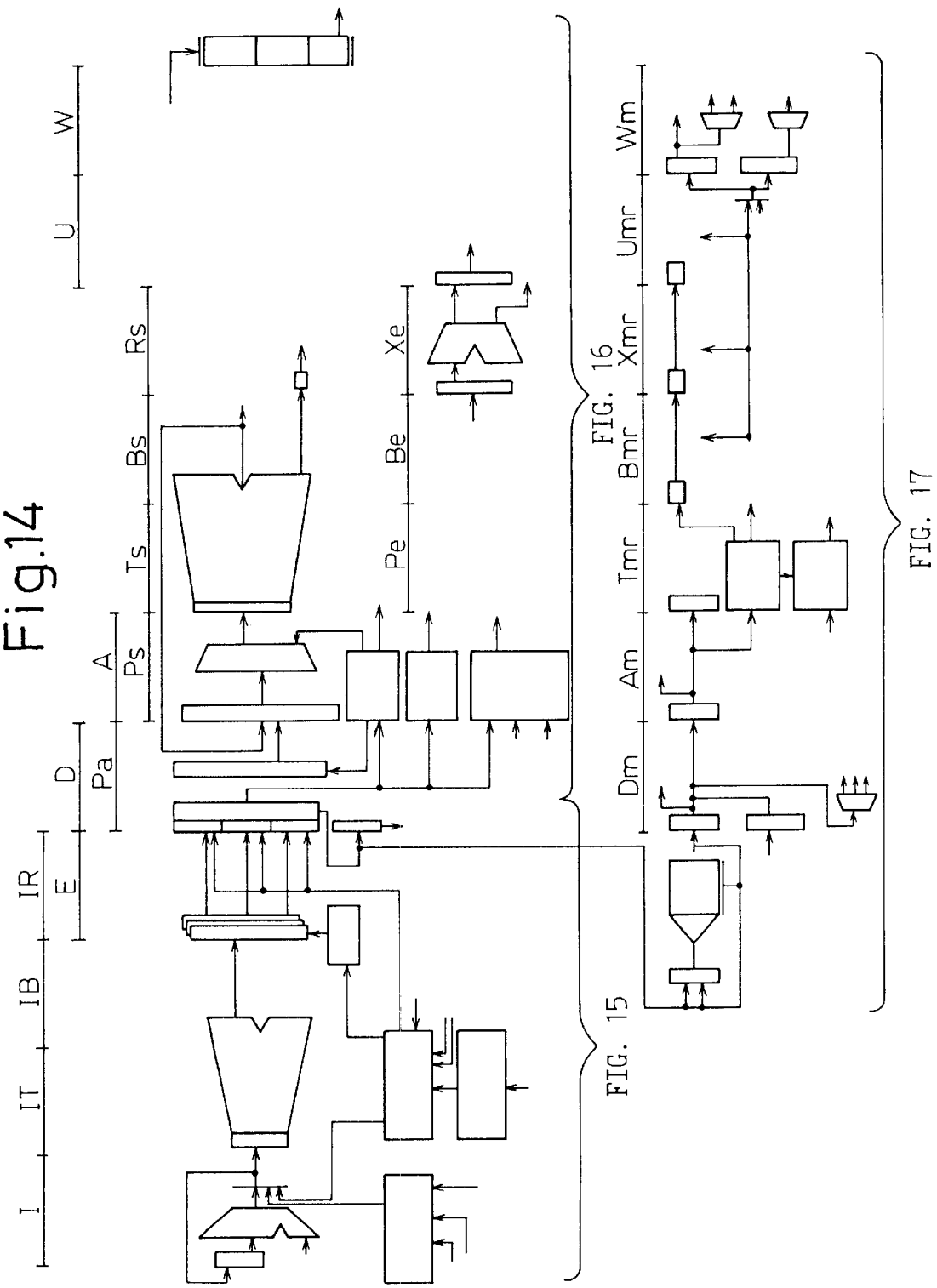
FIG. 14 is a view of the overall configuration of an instruction processing circuit for executing microprogram control provided with a queue stack in the present invention and the connection among circuit blocks of FIG. 15 to FIG. 17.

FIG. 14 to FIG. 17 show an instruction processing circuit for microprogram control using a queue stack. FIG. 14 shows the overall configuration of the circuit and the connection of FIG. 15 to FIG. 17.

First, an explanation will be made of the general operation of the circuits of FIG. 14 to FIG. 17. Instructions are fetched from the cache of FIG. 15 to the instruction buffers IBUFFER, and then loaded to the instruction registers (IWR0, 1, and 2). Each loaded instruction is decoded at the D-cycle. If it is an instruction using a microprogram, the instruction is loaded into a latch (IWRM) for holding microprogram instructions and an operation code is sent to a DOPC of FIG. 17.

Moreover, the operation code of the instructions is sent to a control storage address register (CSAR) for starting up the microprogram and the microprogram control information is read successively from the main control storage (MCS) to the DTAG. When decoding instructions at the D-cycle, the information relevant to the instructions is recorded in a commitment state entry (CSE) block, information relevant to address production is recorded in the RSA, and information relevant to the processing is recorded in the RSE (see FIG. 16).

An operand request is sent from the RSA to a cache according to the entry information during the A-cycle and shifted in cycle sequentially from Ps to Ts, Bs, and Rs (see the FIG. 16) and the operand data loaded in the LR. At the Rs cycle, a fetch completion signal (FCH-COMP) indicating that reading the operand data is completed is returned to the CSE. "Ps" refers to the Priority of Storage unit (Ps), which is a state for issuing an operand address. "Ts" refers to the Tag Read of the Storage unit (Ts), which is a state for modifying and searching for an operand address from the TLB and Tag. "Bs" refers to the Buffer Read of the Storage unit (Bs), which is a state for reading the data from the modified and searched operand address. "Rs" refers to the Result of Storage unit (Rs), which is a state in which the read data is returned. "Pe" refers to the Priority of the Execution unit (Pe), which is a state for reading REGISTER. "Xe" refers to the execution of the Execution unit, which is a state for executing the operation.

In the RSE, when entry information is recorded, a processing execution request is output to the E-UNIT based on the entry information, the cycle shifted from Pe to BE and Xe, and the processing executed at the Recycle. When execution of the processing is completed at the Xe cycle, an execution completion signal (EU-COMP signal) is returned to the CSE.

The CSE waits for the completion signals (FCH-COMP, EU-COMP) from the functional units (S-UNIT, E-UNIT) to confirm the end of the processing of the functions. When there is a report of completion of all of the processing required for the instructions or one cycle, it outputs a signal (COMMIT-COMP) that it judges the execution of instructions will be completed at the U-cycle.

Figure 17:
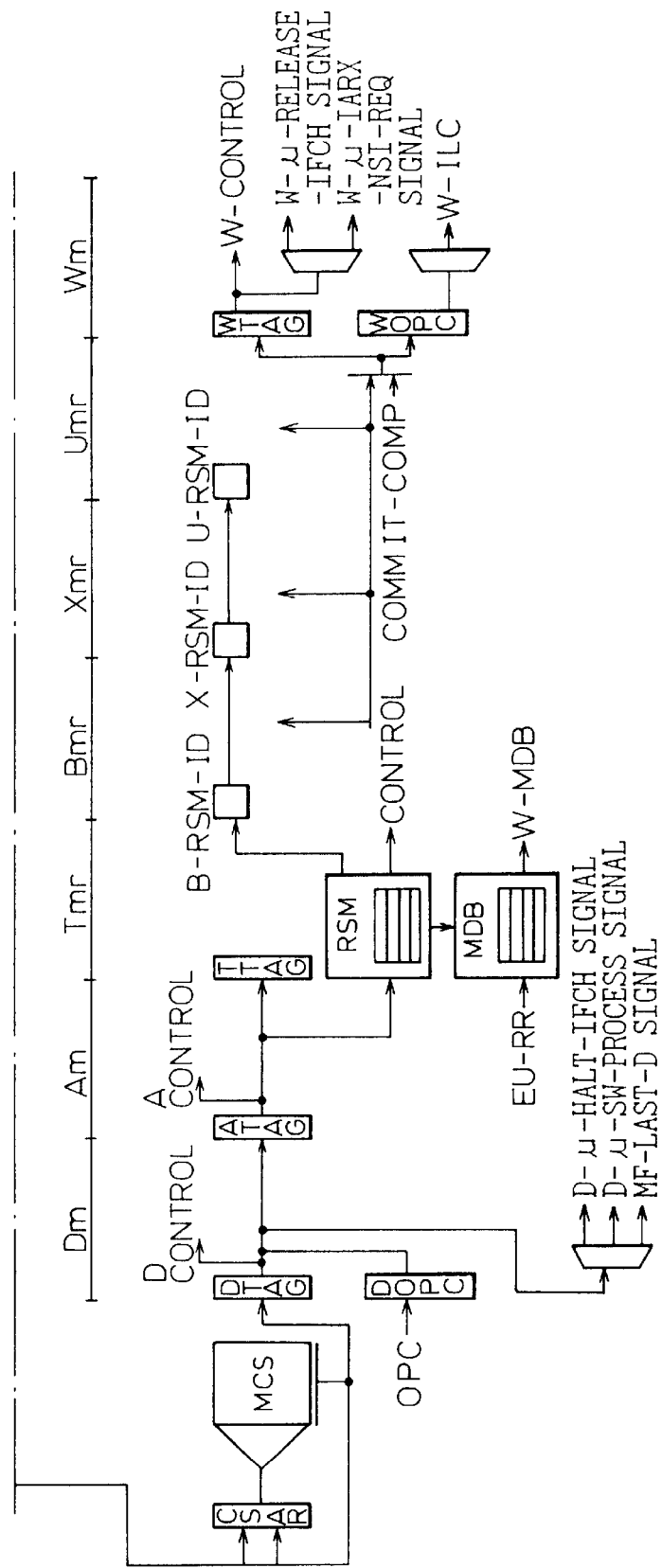
FIG. 17 is a circuit diagram showing the detailed configuration of a third section of FIG. 14.

The microprogram control information read from the MCS of FIG. 17 is shifted together with the operation code from DTAG to ATAG and TTAG. The cycles (Dm, Am, and Tmr) are controlled by the microprogram. At the Tmr cycle, the entry information (operation code and microprogram control information) is recorded in a reservation station microprocessor (RSM). The recorded entry information is used for control of the Bmr, Xmr, and Umr cycles. The entry information is released in the order of recording. MDB is a buffer for temporarily holding the processing results read by the microprogram and corresponds to the entries of the RSM.

In the control of the Bmr, Xmr, and Umr cycles, the entry number (RSM-ID) of the RSM synchronized with the release timing from the Pe state to the Be state of the processing unit is shifted from Bm to Xm and Um and microprogram control information fetched from the RSM at any state so as to control the states (Bmr, Xmr, and Umr). When a report of completion of everything required for execution of instructions is sent from the functional units to the CSE, a signal (COMMIT-COMP) indicating judgment of completion of execution of instructions is output, the entry information is loaded from the RSM to WTAG, and control of the Wm cycle becomes possible.

As explained above, in the same way as the conventional microprogram processing by pipeline processing, the method of executing instructions using a queue stack enables control by a microprogram using the states as Dm, Am, Tmr, Bmr, Xmr, Umr, and Wm. "Dm" refers to the D-cycle of the microprogram processing. Information of the DTAG is decoded and executed in the Dm cycle. The Dm is a state for executing an indication to halt the instruction fetch processing based on: the DTAG, the indication to change a state to the PROCESS-STATE, and the indication to halt the microprogram. "Am" refers to the A-cycle of the microprogram processing. Information of the ATAG is decoded and executed in the Am cycle. The information of the ATAG is passed to the next TTAG and RSM. "Am" is a state indicating transmittal of an operand address based on the information of the ATAG. When the operand address transmitting is indicated in Am cycle, an address produced based on the information from RSA is transmitted to the cache. When a state is changing to Ps, Ts, Bs, and Rs, data is read from the cache. When a state is changing to U and W, the data is transmitted to the MDB via an operational unit. "Tmr" is T-cycle of microprogram processing. Information of the TTAG is decoded and executed in the Tmr cycle. The RSM-ID added to the information registered to the RSM is passed to the next Bmr cycle in the order of the registering. There is no execution in the Tmr. "Bmr" is a B-cycle of microprogram processing. Information in the RSM designated by the B-RSM-ID is decoded and executed in the Bmr cycle. There is no execution in the BMR. "Xmr" is X-cycle of microprogram processing. Information in the RSM is designated by the X-RSM-ID is decoded and executed in the Xmr cycle. There is no execution in the Xmr. "Umr" is X-cycle of microprogram processing. Information in the RSM is designated by the U-RSM-ID is decoded and executed in the Umr cycle. There is no execution in the Umr. "Wm" is W-cycle of microprogram processing. Information in the WTAG is decoded and executed in the Wm cycle. "Wm" is a state for executing indication to update the PSW (MDB to PSW), indication to release the instruction fetch halt, and indication to create next instruction address (PSWIAR+W-ILC).

In the present invention, along with the above change in the method of executing instructions, there is provided an instruction re-read operation using a microprogram which can establish a new method of rereading instructions and realize an increase in speed of the instruction re-read operation—a perennial problem in information processing systems—while reducing the hardware.

The operations of the circuit of FIG. 14 to FIG. 17 will be explained in detail for each type of instruction re-read operation using the timing charts of FIG. 18 to FIG. 20 and the views of the hardware configuration of FIG. 21 to FIG. 33. As types of instruction re-read operations, an explanation will be made of the example of a basic instruction re-read operation using a microprogram, an example of an instruction re-read operation after producing a subsequent instruction address, and an example of an instruction re-read operation influenced by the state in interrupt processing.

An example of basic instruction re-read operation follows.

The basic instruction re-read operation is performed by the LPSW instruction. Among the timing charts of FIG. 18 to FIG. 20, FIG. 18 shows the processing of this example.

Figure 1:
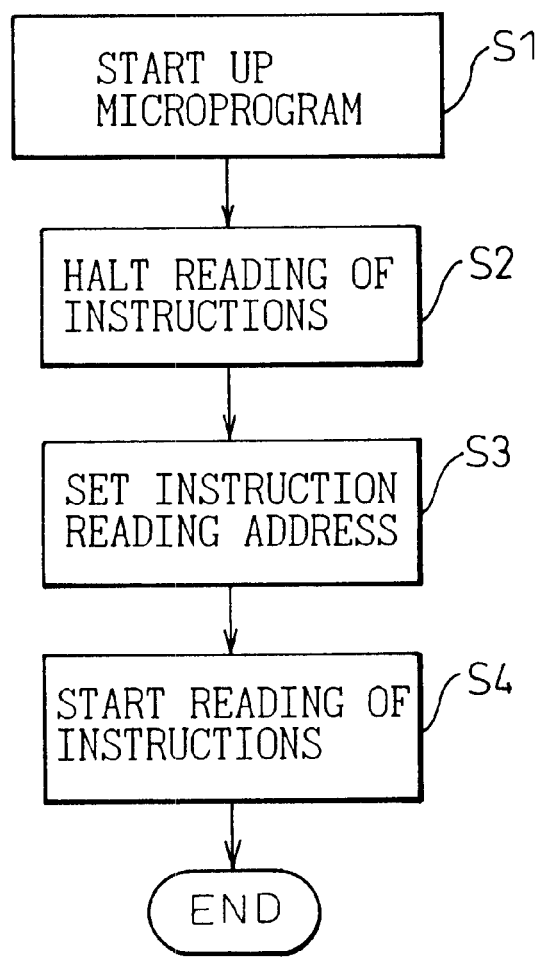
FIG. 1 is a flowchart of the instruction re-read routine using a microprogram in the present invention and a related art.
Figure 2:
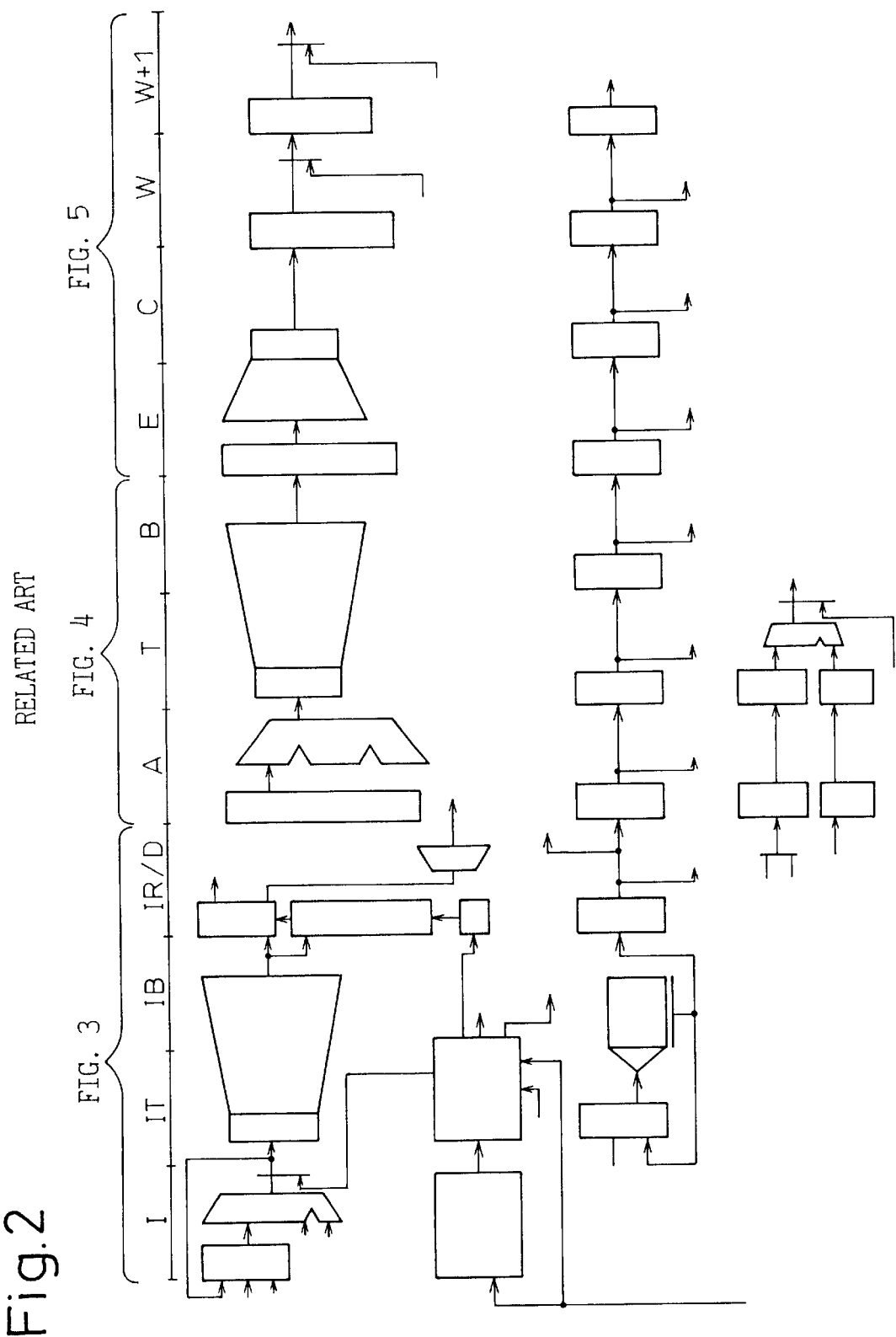
FIG. 2 shows the overall configuration of an instruction processing circuit for an instruction re-read operation using pipeline processing and the connection among circuit blocks of FIG. 3 to FIG. 5.
Figure 3:
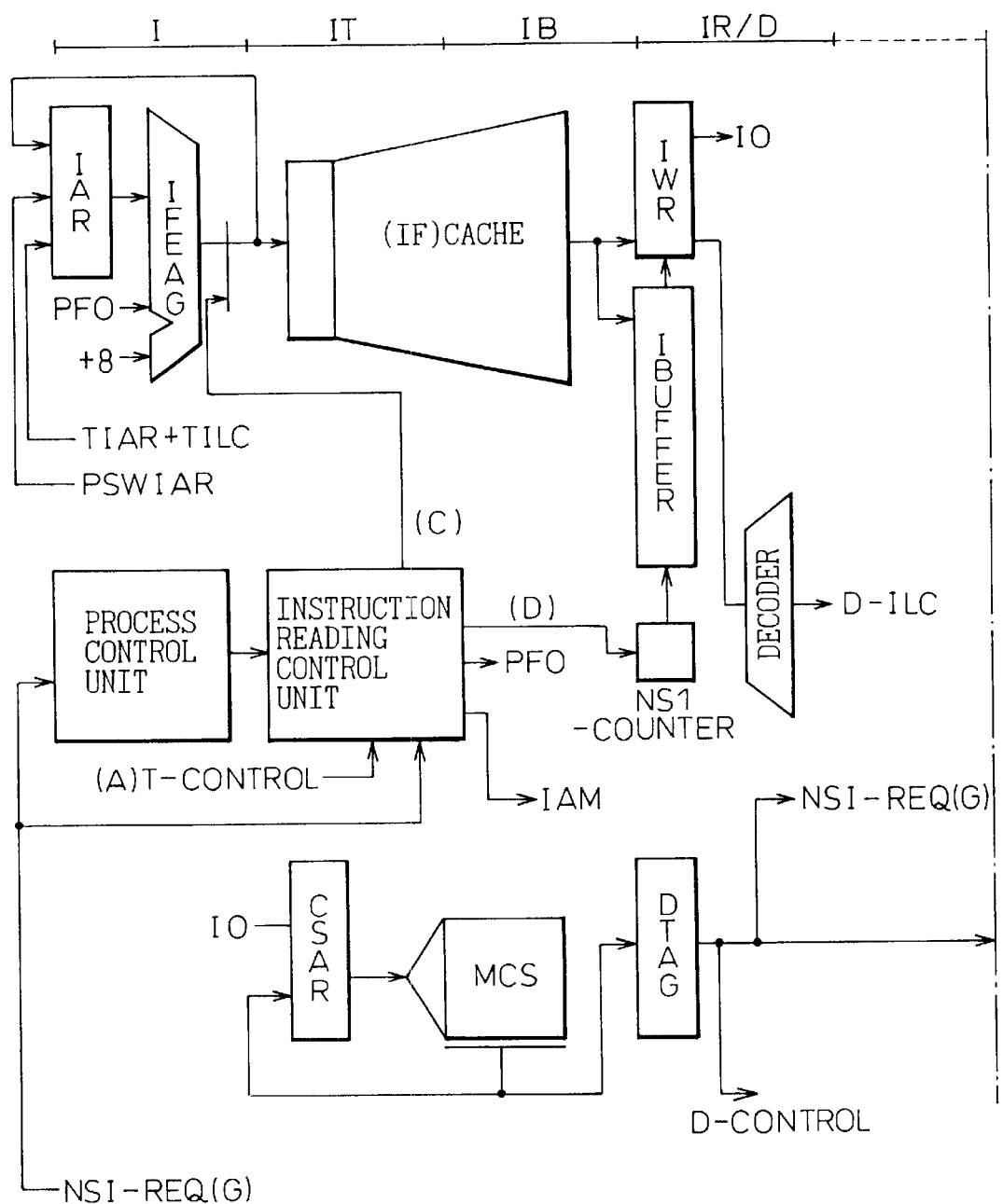
FIG. 3 is a circuit diagram of the detailed configuration of a first section shown in FIG. 2.
Figure 4:
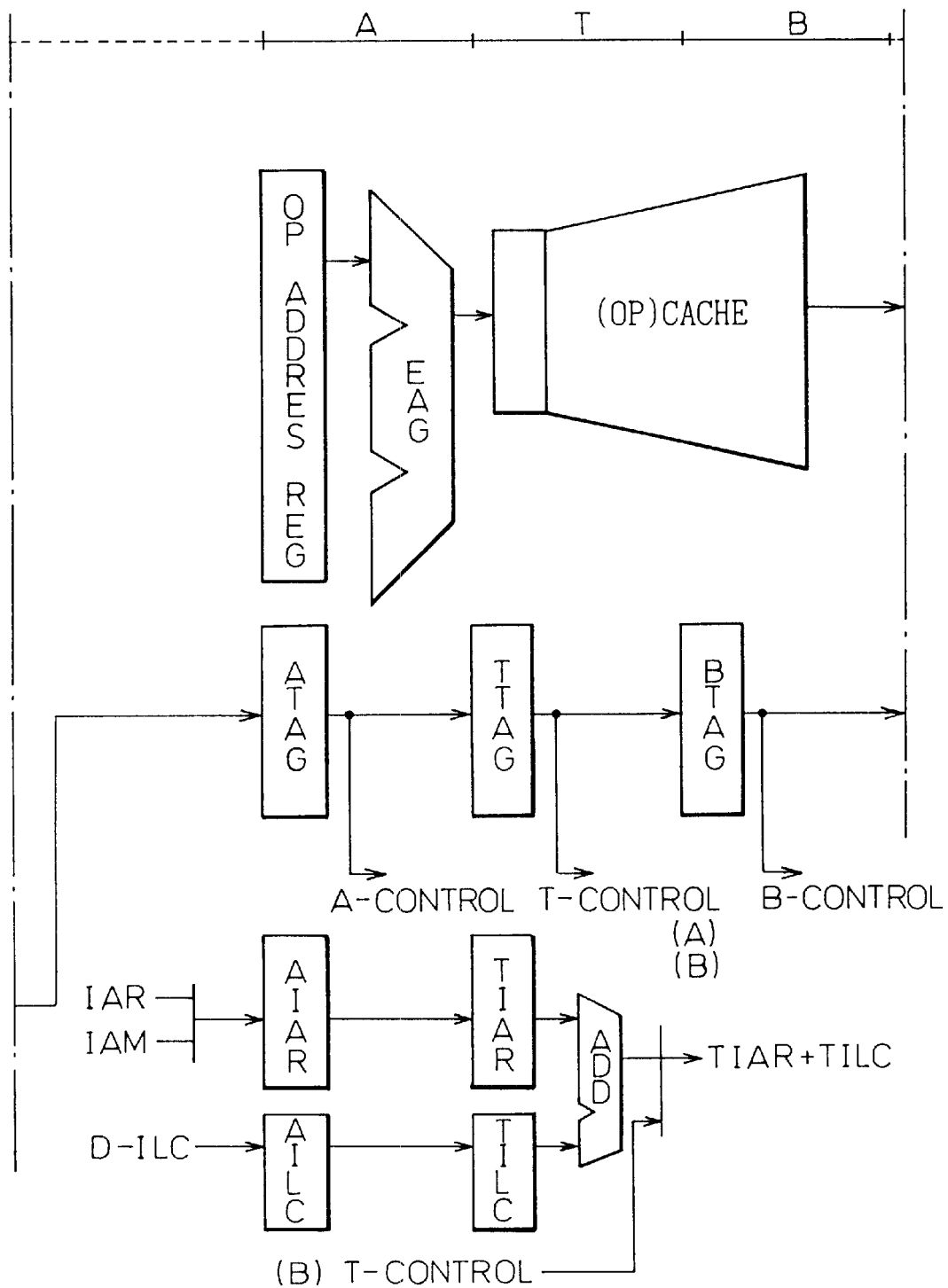
FIG. 4 is a circuit diagram of the detailed configuration of a second section of FIG. 2.
Figure 5:
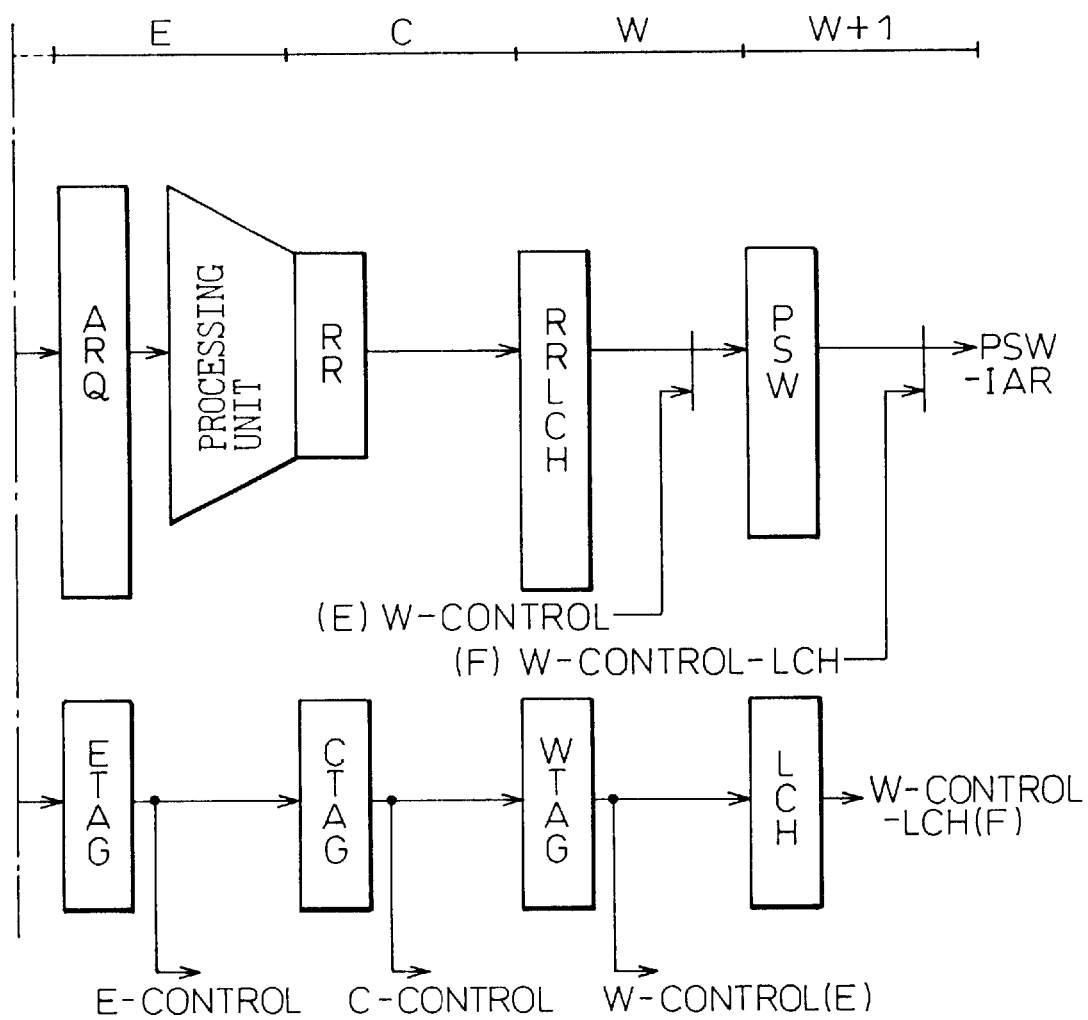
FIG. 5 is a circuit diagram of the detailed configuration of a third section of FIG. 2.
Figure 6:
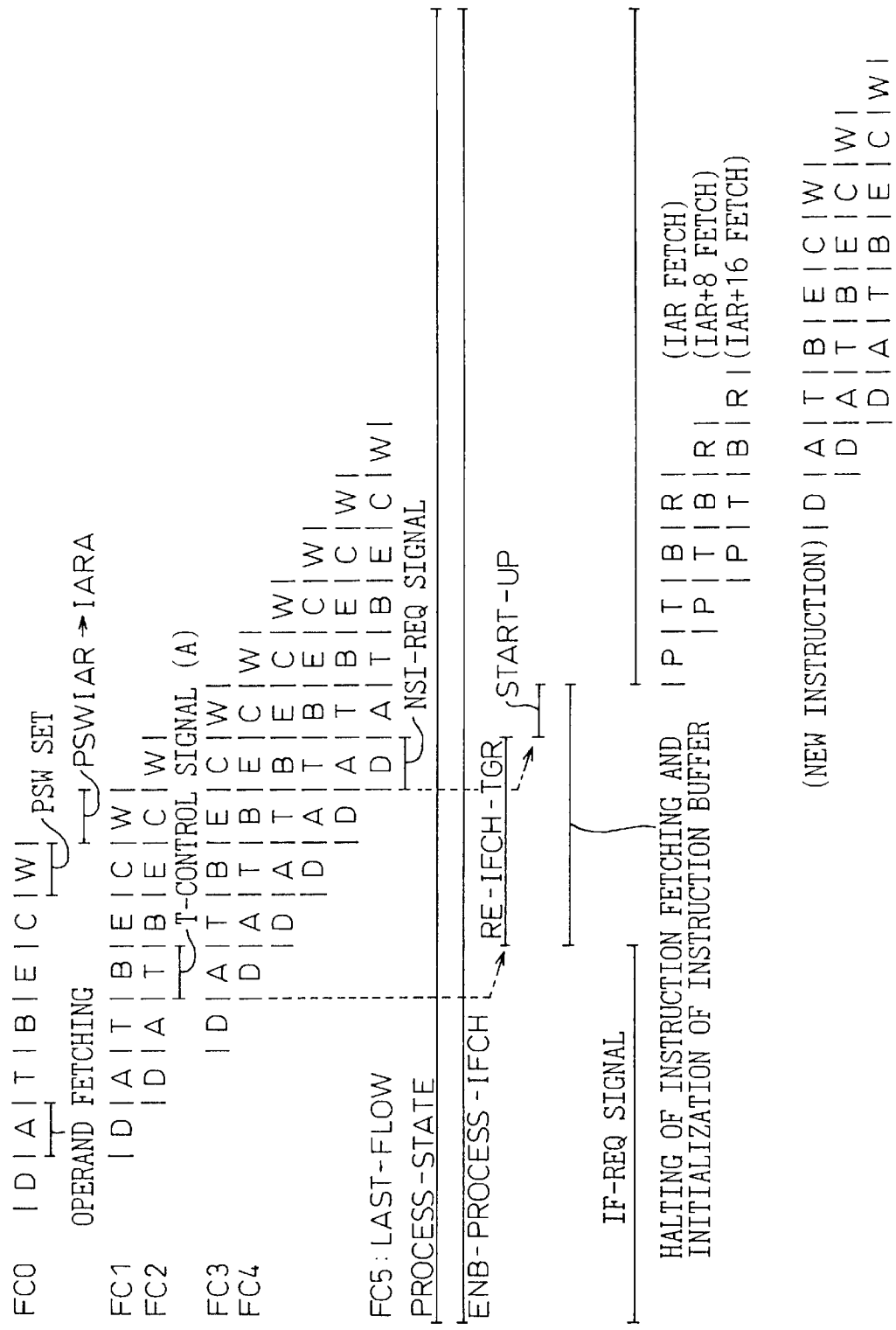
FIG. 6 is a timing chart of a basic instruction rereading operation of the instruction processing circuit of FIG. 2.
Figure 7:
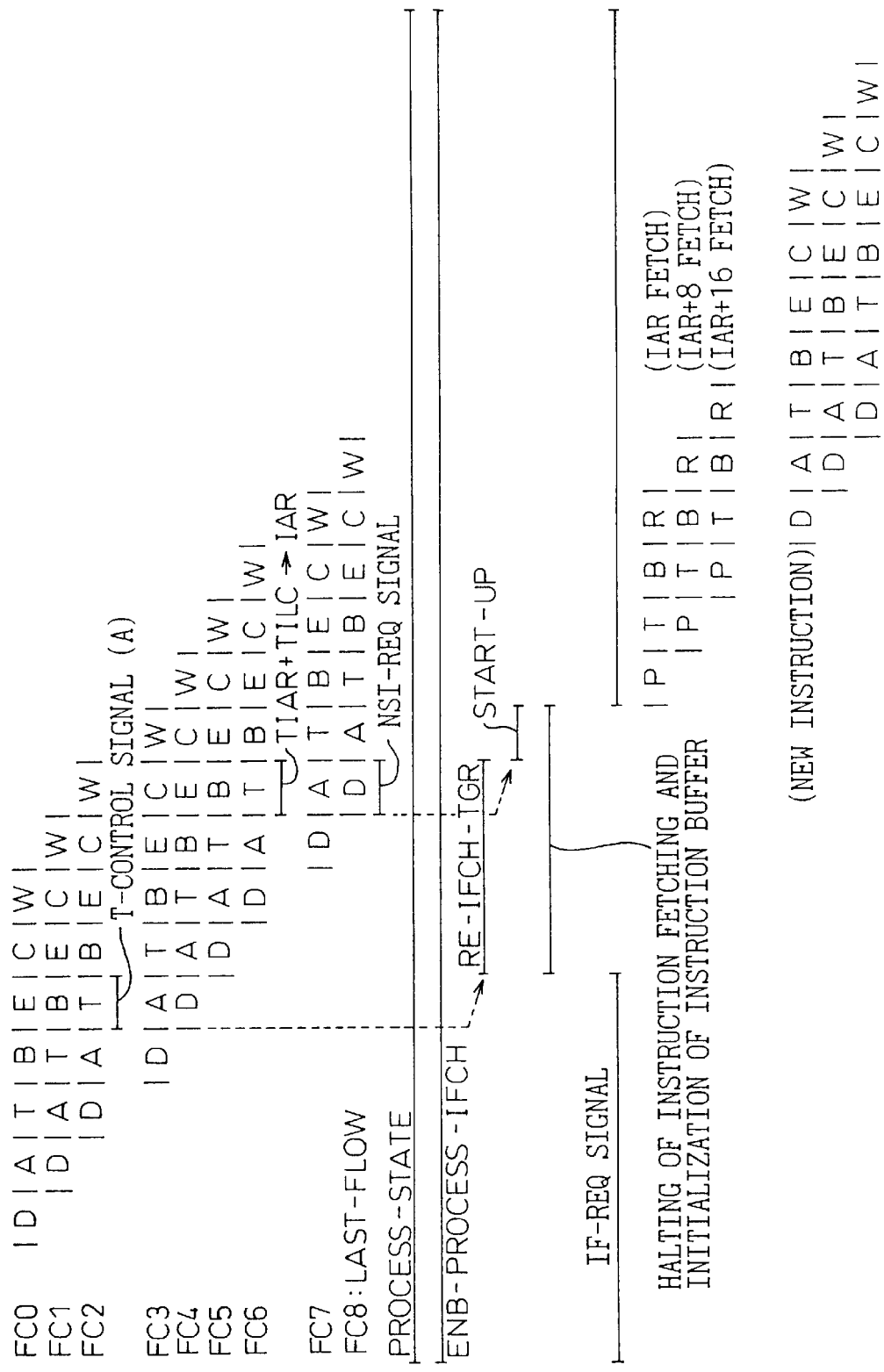
FIG. 7 is a timing chart of an instruction re-read operation by a subsequent instruction address of an instruction processing circuit of FIG. 2.
Figure 8:
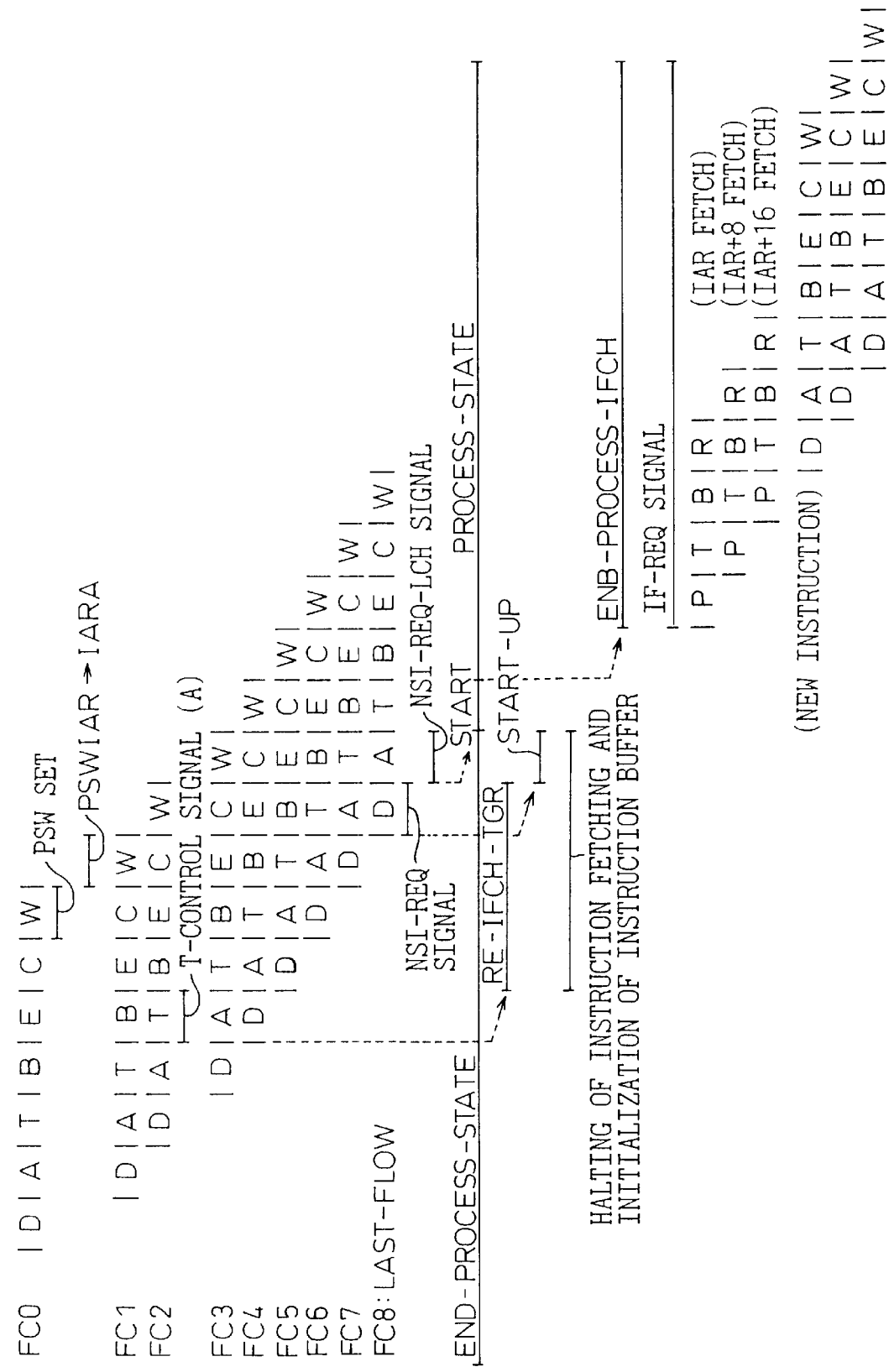
FIG. 8 is a timing chart of an interrupt processing operation of the instruction processing circuit of FIG. 2.
Figure 9:
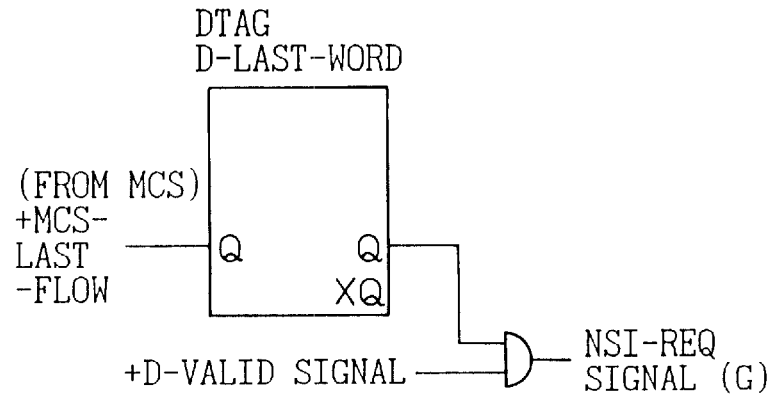
FIG. 9 is a view of the hardware configuration of a DTAG employed in the instruction processing circuit of FIG. 2.
Figure 10:
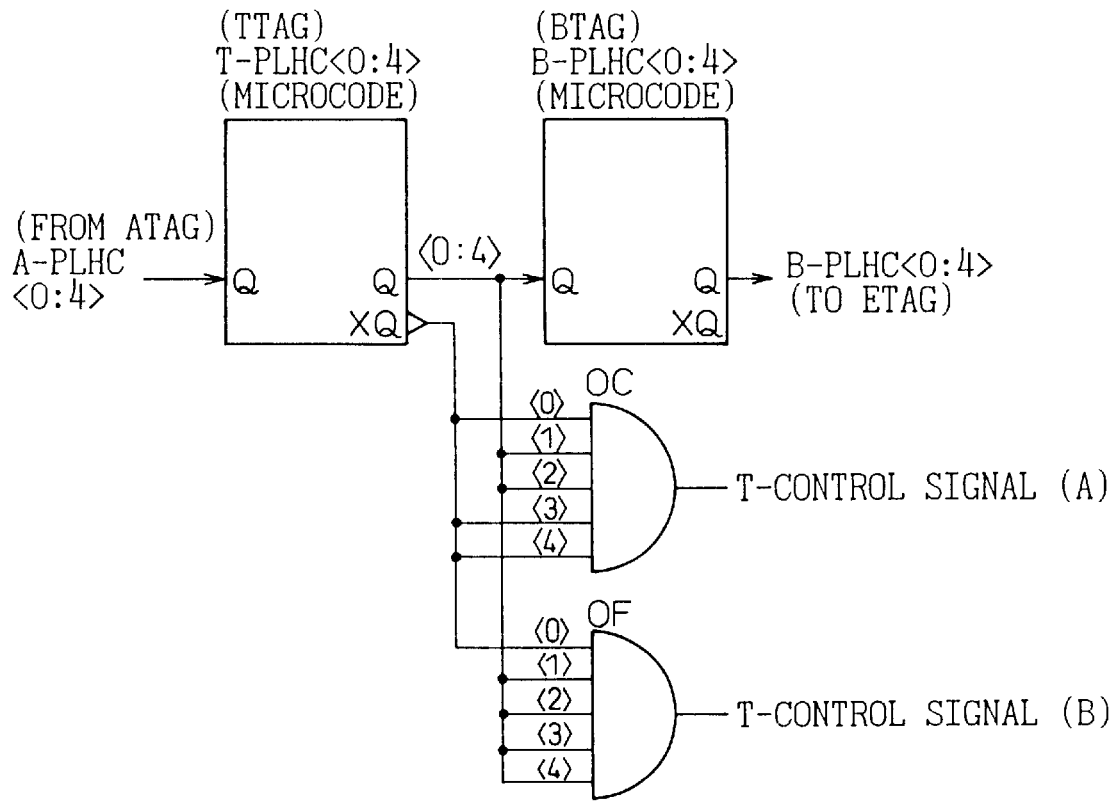
FIG. 10 is a view of the hardware configuration of a TTAG and BTAG employed in the instruction processing circuit of FIG. 2.
Figure 11:
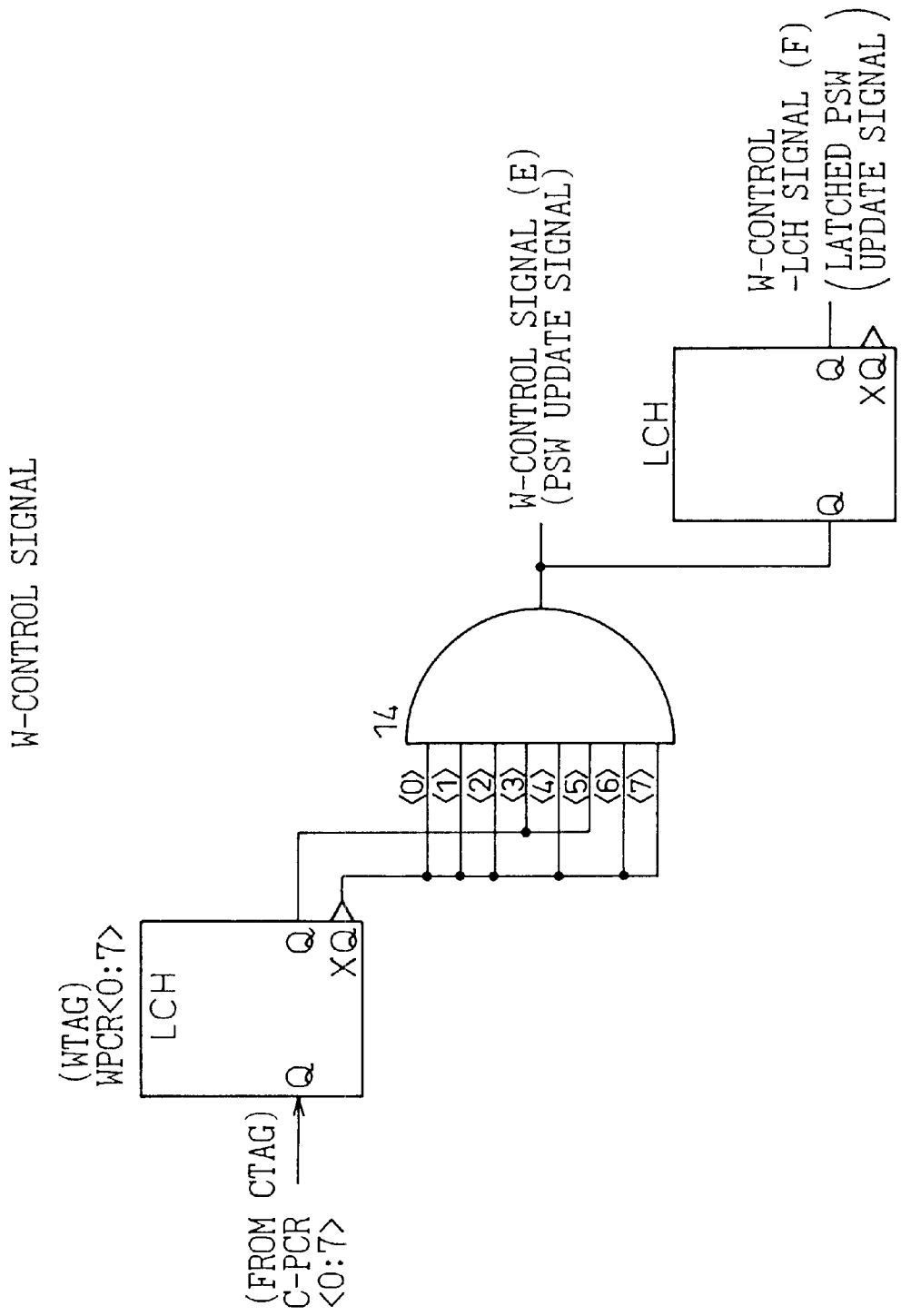
FIG. 11 is a view of the hardware configuration of a WTAG employed in the instruction processing circuit of FIG. 2.
Figure 12:
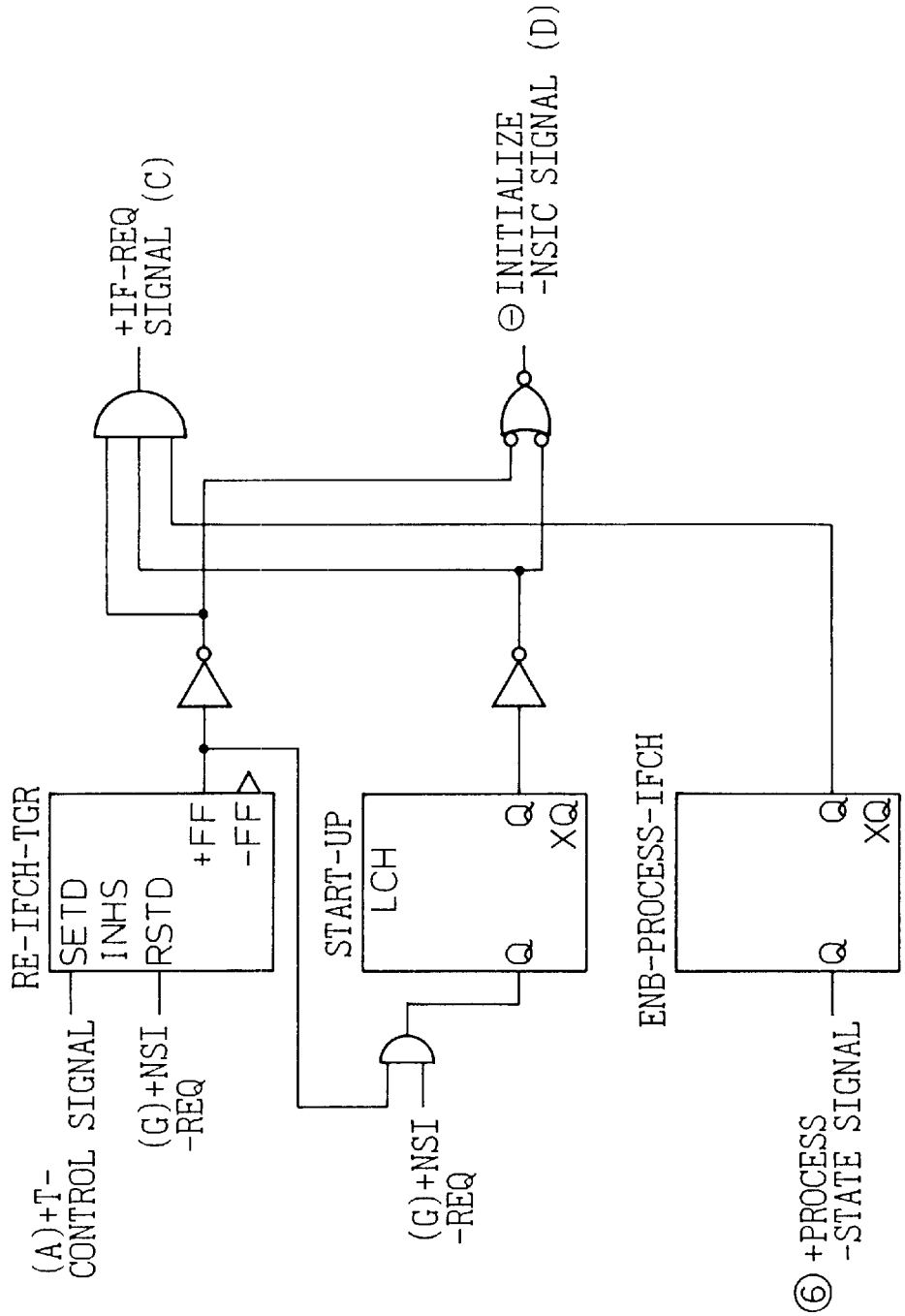
FIG. 12 is a view of the hardware configuration of a reading control unit employed in the instruction processing circuit of FIG. 2.
Figure 13:
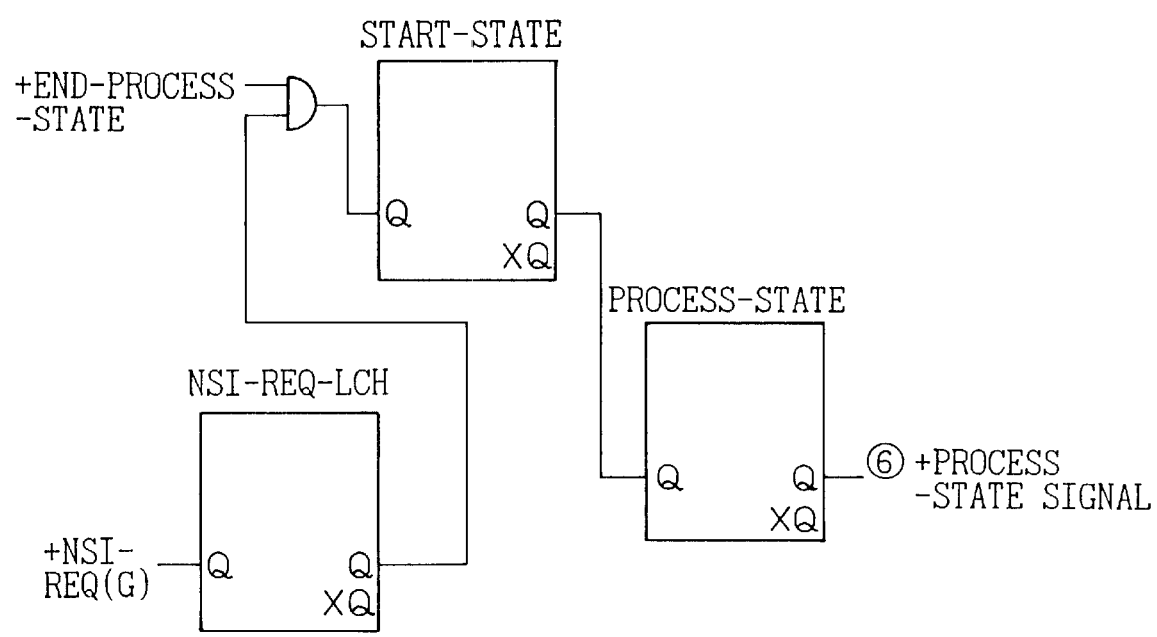
FIG. 13 is a view of the hardware configuration of a process control unit employed in the instruction processing circuit of FIG. 2.

In response to the LPSW instruction, the instruction re-read processing is executed in time series in accordance with the routine of FIG. 1. First, in the startup of the microprogram of step S1 of FIG. 1, in FIG. 15, instructions are fetched from a cache into the instruction buffers (IBUFFER). The instructions are loaded into an instruction register (IWR0/½). The loaded instructions are decoded at the D-cycle and if microprogram instructions, the instructions are loaded in a latch (IWRM) for holding microprogram instructions and an operation code is sent to DOPC of FIG. 17.

The operation code of the instructions is sent to a control storage address register (CSAR) for starting up a microprogram, microprogram control information (PLHC, EMIT, etc.) is read successively from the main control storage (MCS) to DTAG and is shifted from Dm to Am, Tmr, Bmr, Xmr, Umr, and Wm together with the operation code, and the processing of the different cycles are performed.

Figure 18:
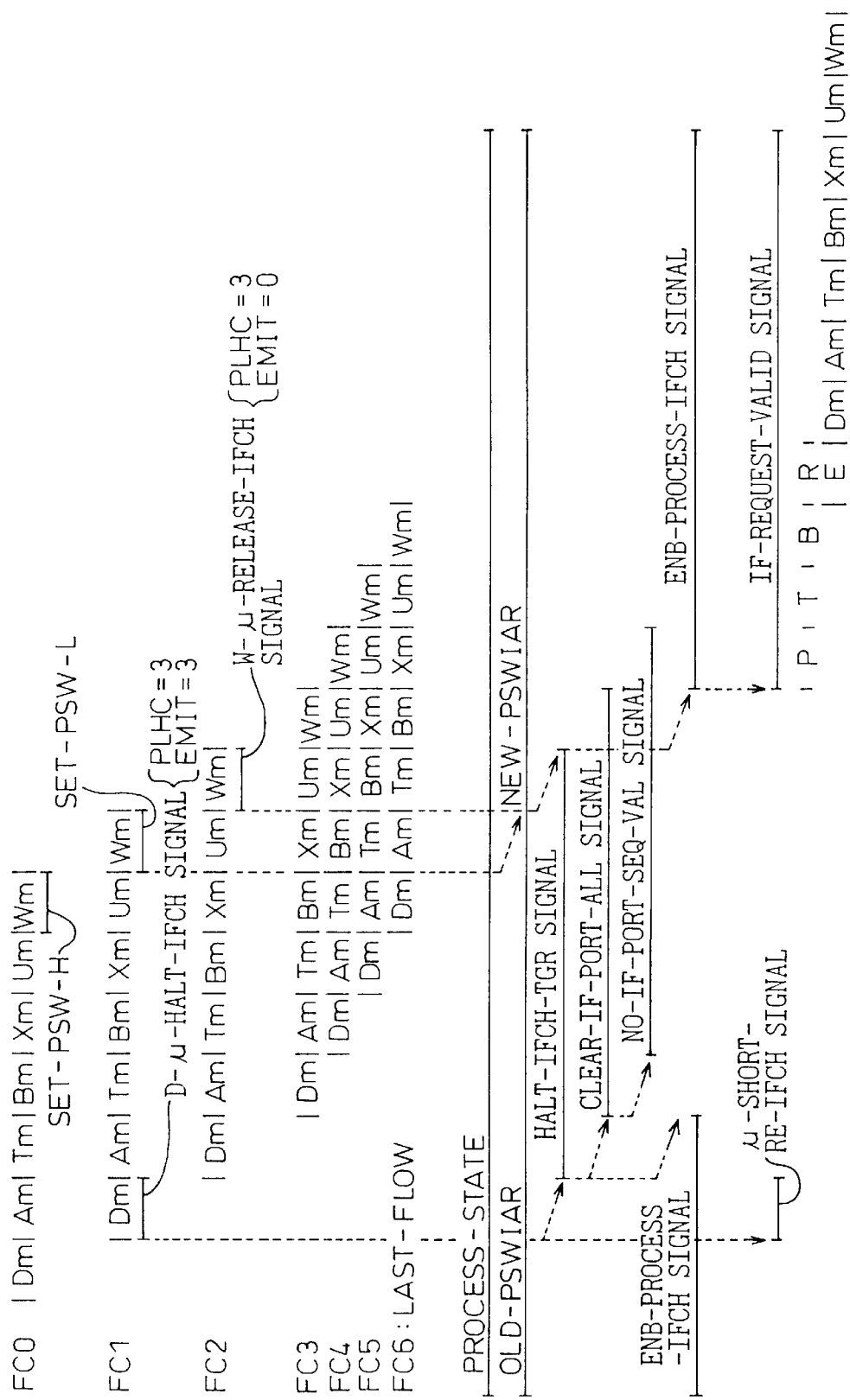
FIG. 18 is a timing chart of the basic instruction re-read operation of the instruction processing circuit of FIG. 14.

The halting of the reading of instructions of step S2 of FIG. 1 is performed by the function counter 1 (FC1) of FIG. 18. The microprogram control information (PLHC=3, EMIT=3) of FC1 read from the MCS of FIG. 17 is shifted from the Dm cycle to the Wm cycle. At this time, the microprogram control information (PLHC=3, EMIT=3) is decoded from the DTAG of the Dm cycle to produce the D-$\mu$-HALT-IFCH signal. "D-$\mu$-HALT-IFCH" refers to a D-Cycle $\mu$ HALT Instruction Fetch, which is an indication to halt instruction fetch by the microprogram in D-cycle.

Figure 15:
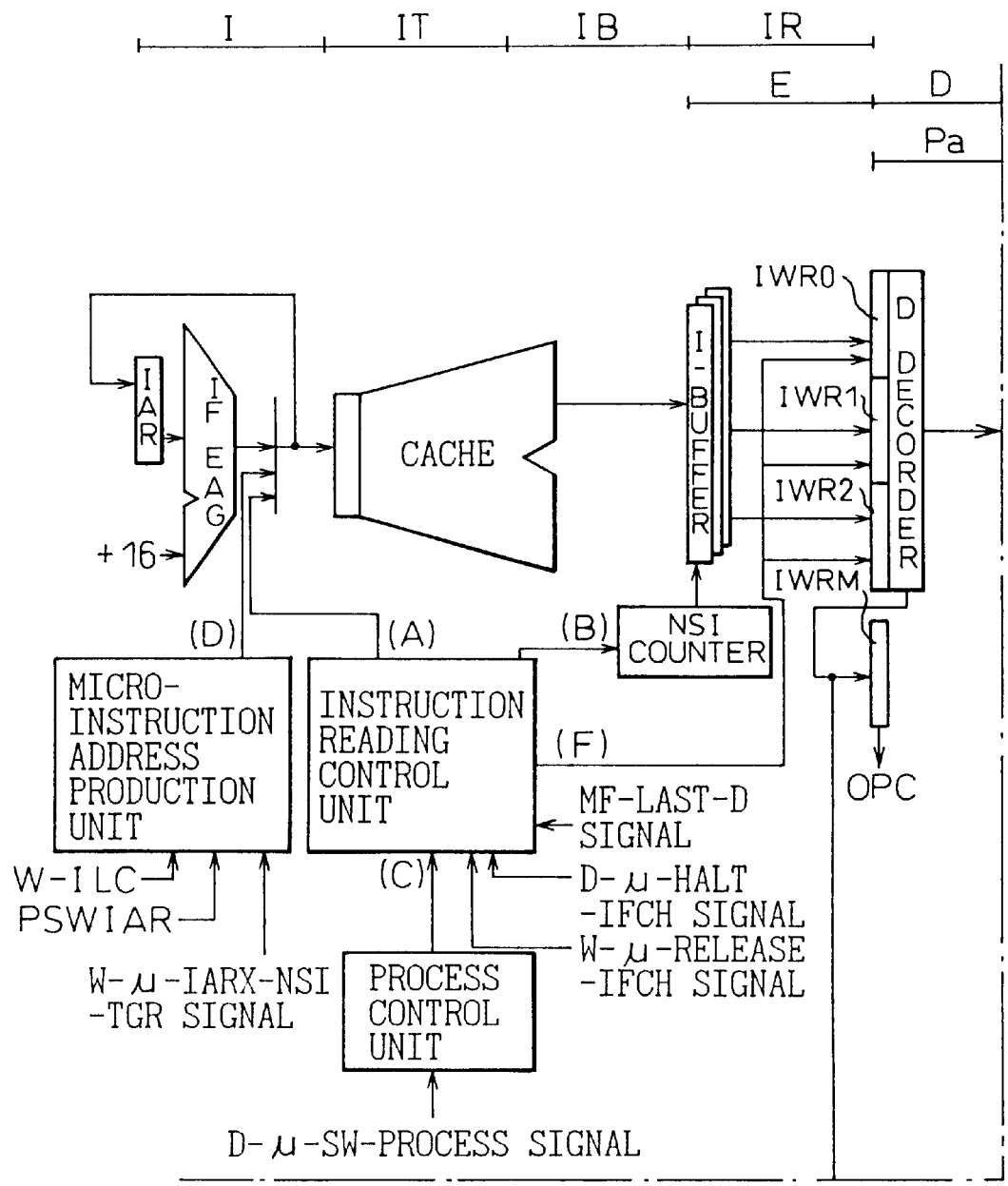
FIG. 15 is a circuit diagram showing the detailed configuration of a first section of FIG. 14.
Figure 23:
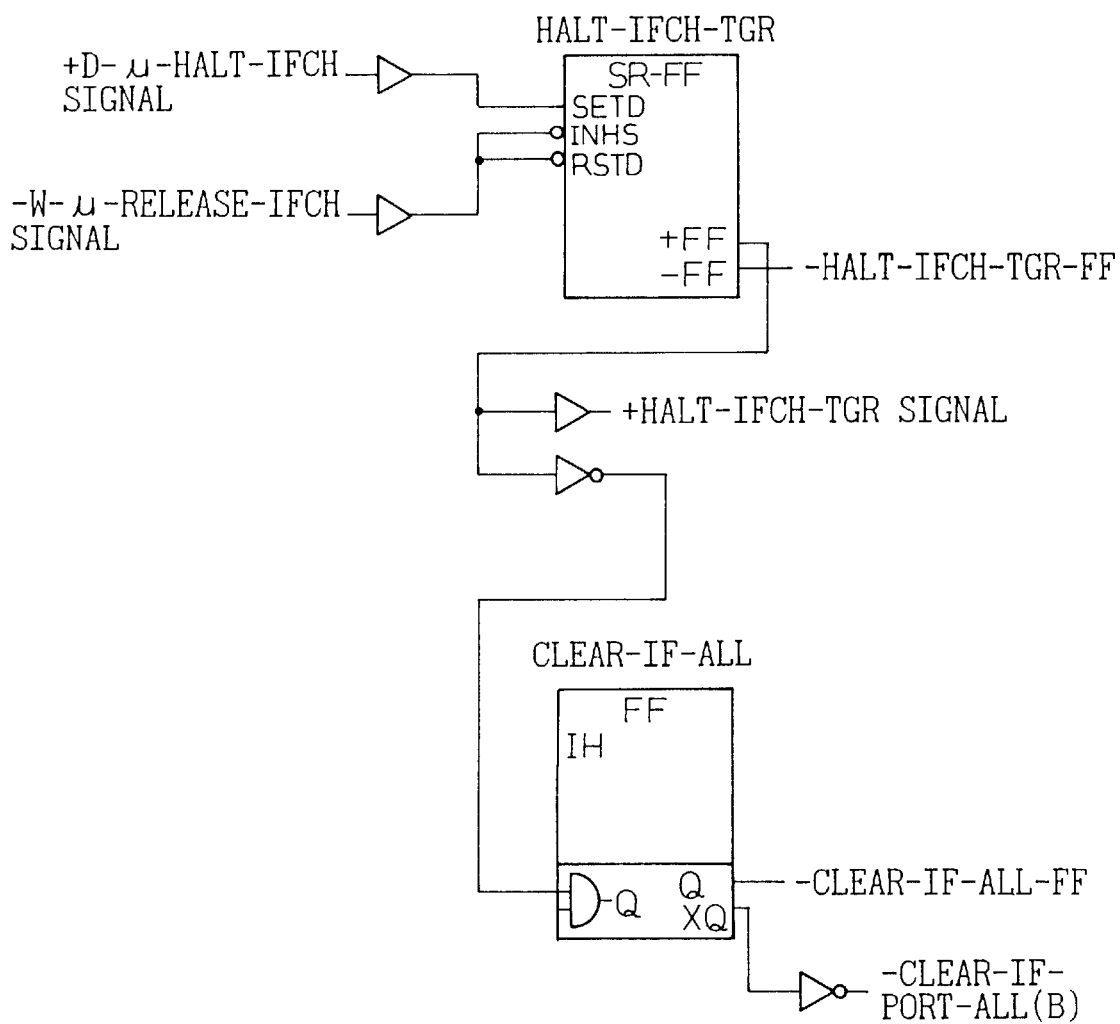
FIG. 23 is a view of the hardware configuration (part 1) of an instruction reading control unit employed in the instruction processing circuit of FIG. 14.
Figure 24:
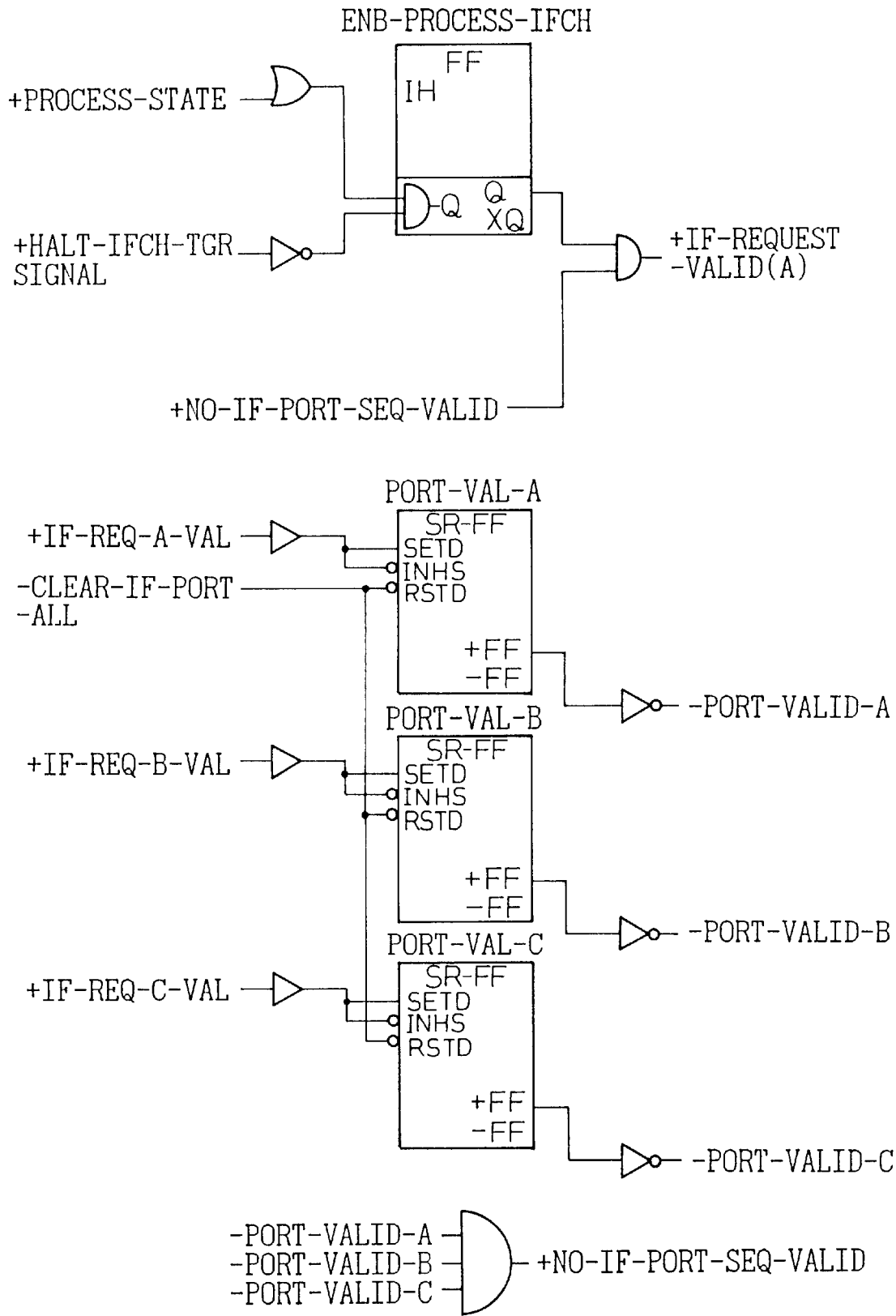
FIG. 24 is a view of the hardware configuration (part 2) of an instruction reading control unit employed in the instruction processing circuit of FIG. 14.
Figure 25:
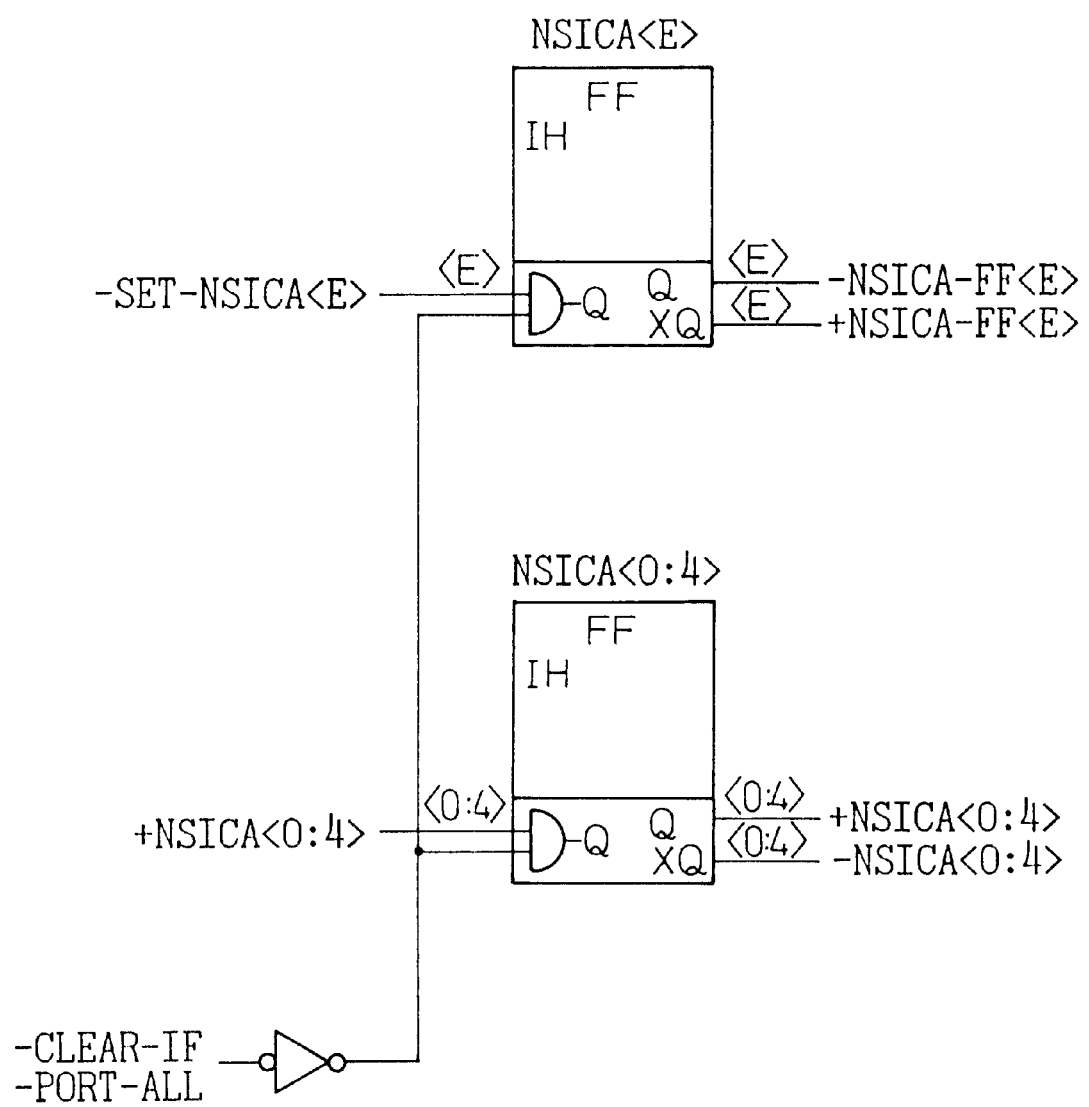
FIG. 25 is a view of the hardware configuration (part 3) of an instruction reading control unit employed in the instruction processing circuit of FIG. 14.
Figure 26:
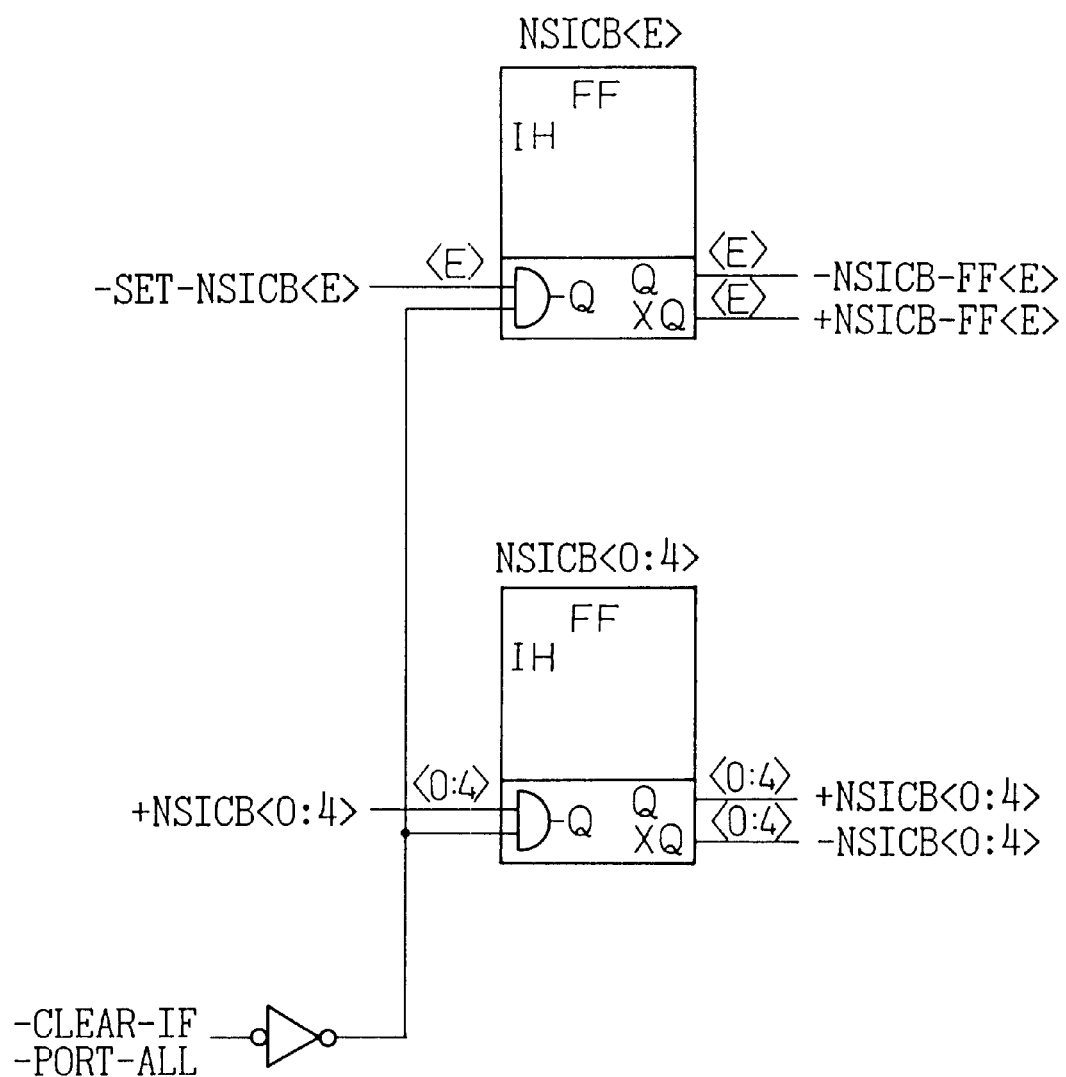
FIG. 26 is a view of the hardware configuration (part 4) of an instruction reading control unit employed in the instruction processing circuit of FIG. 14.
Figure 27:
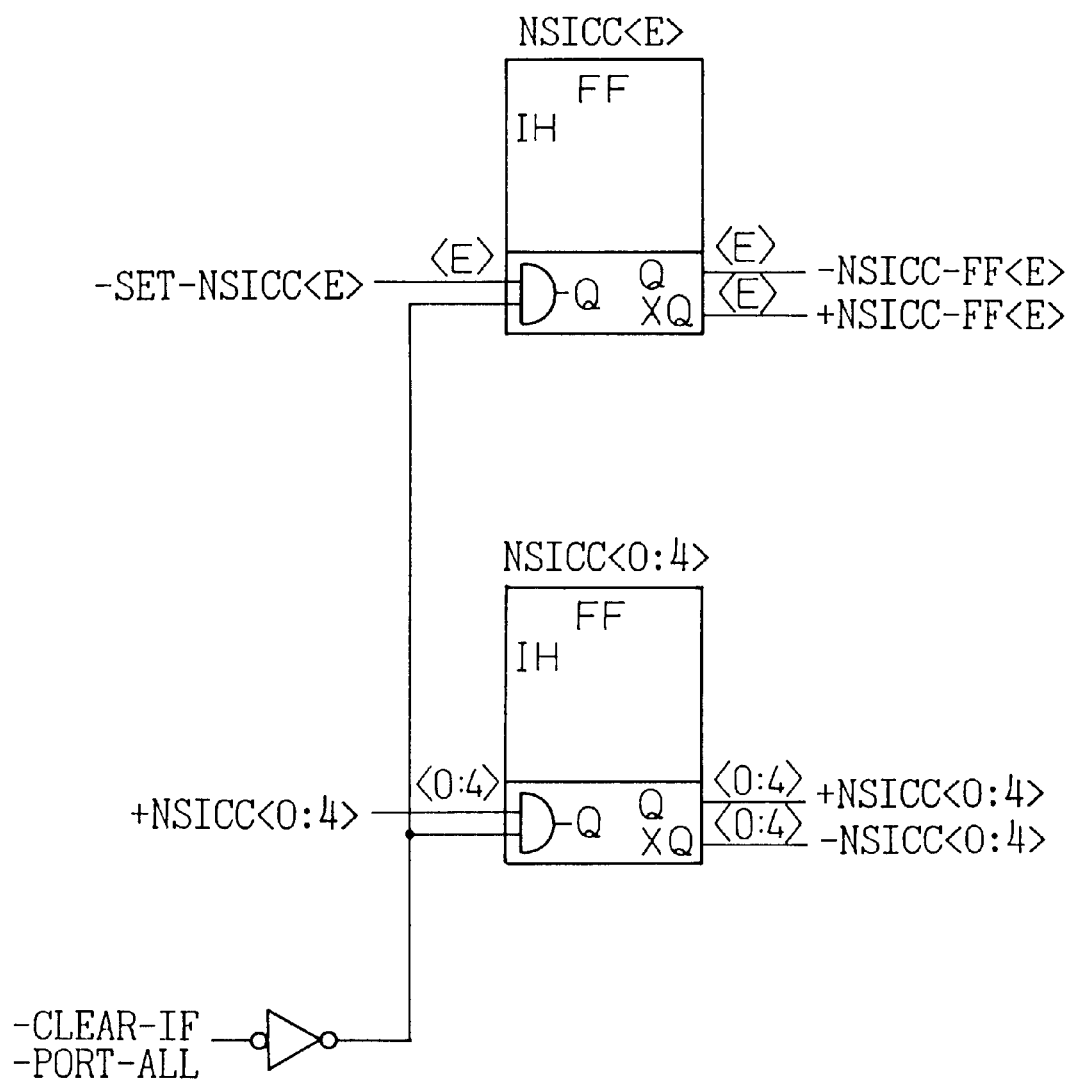
FIG. 27 is a view of the hardware configuration (part 5) of an instruction reading control unit employed in the instruction processing circuit of FIG. 14.

The produced signal D-$\mu$-HALT-IFCH signal is sent to an instruction reading control unit of FIG. 15, the HALT-IFCH-TGR latch of FIG. 23 is activated, the ENB-PROCESS-IFCH latch of FIG. 24 is deactivated, and the (A) IF-REQUEST-VALID signal of FIG. 15 is prevented from being output so as to halt the reading of instructions. Further, the (B) CLEAR-IFCH-ALL signal of FIG. 15 is sent from the instruction reading control to the NSI-COUNTER indicating the state of the IBUFFERs and the location of instruction reading data whereby the instruction buffers are initialized. "HALT-IFCH-TGR" (Halt Instruction Fetch Trigger) refers to an indication of a starting point of instruction fetch halt.

The setting of the instruction read address of step S3 of FIG. 1 is performed by FC0 and FC1 of FIG. 18. The microprogram control information of FC0 and the microprogram control information of FC1 are successively read from the MCS of FIG. 17 and shifted from the DM cycle to the Wm cycle. At this time, at the Am cycle of FIG. 17, operand fetch instructions are issued from the FC0 and FC1 and A-CONTROL. First, at the FC0, the microprogram control information is decoded from the WTAG of the Wm cycle and the W-CONTROL signal is produced and travels from the result register (EU-RR) of FIG. 16 through the MDB. Due to the W-CONTROL signal, the output is written at the PROGRAM STATUS WORD HIGH side (PWS-HIGH).

Figure 16:
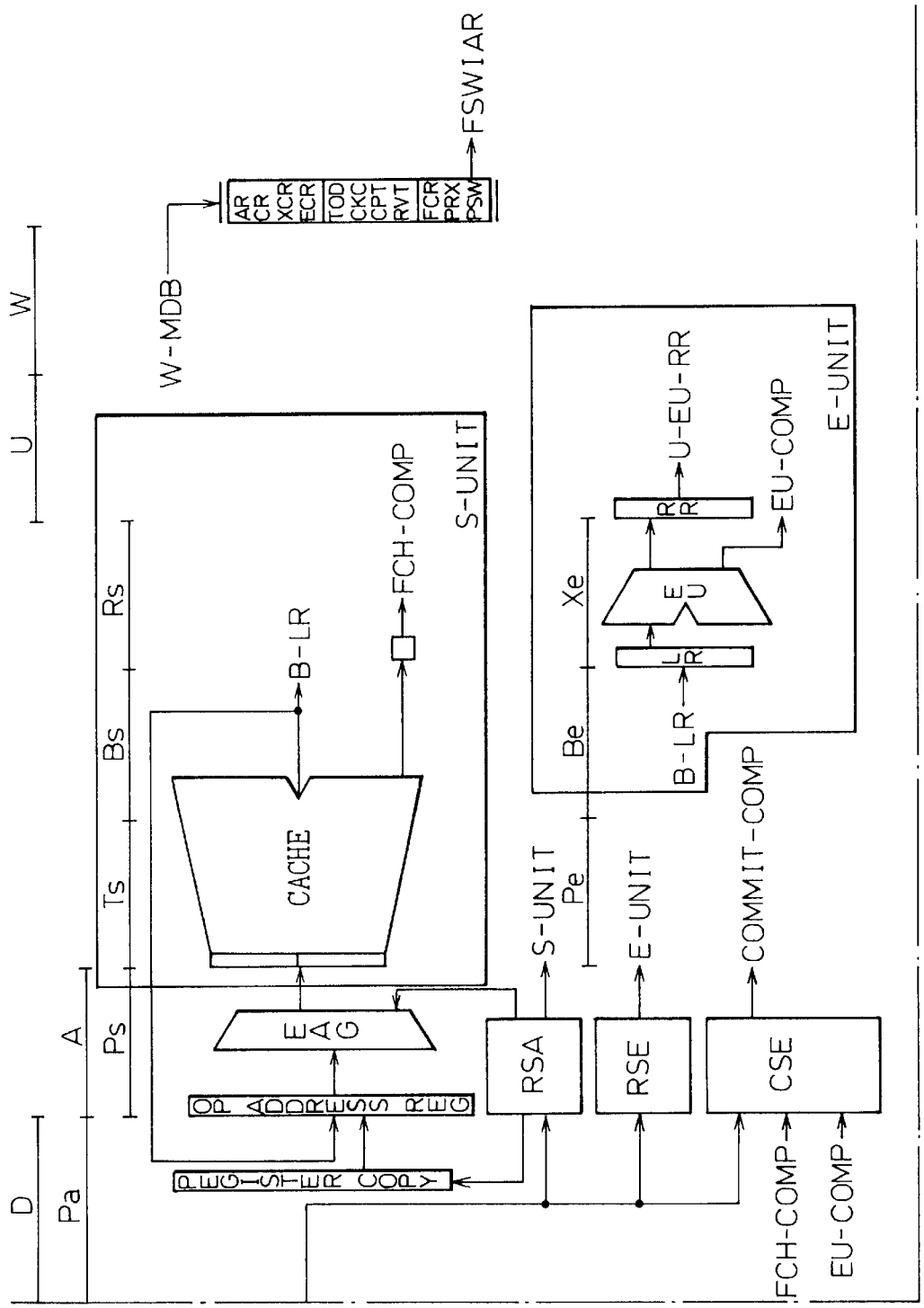
FIG. 16 is a circuit diagram showing the detailed configuration of a second section of FIG. 14.

Next, at the FC1, the microprogram control information is decoded from the WTAG of the Wm cycle and a W-CONTROL signal is produced and travels from the EU-RR of FIG. 16 through the MDB. Due to the W-CONTROL signal, the output is written in the PROGRAM STATUS WORD LOW side (PSW-LOW). After the change of the PSW, PSWIAR is sent to an instruction re-read address production unit and the instruction re-read address is held. Since PSWIAR is input to IARX and IARX-NIX-TGR is inactive of FIG. 29, "0" is input to the IARX-ILC. The instruction re-read address is shown as PSWIAR from FIG. 29 to FIG. 31.

The start of reading at step S4 of FIG. 1 is performed by FC2 of FIG. 18. The microprogram control information (PLHC=3, EMIT=0) of FC2 read from the MCS of FIG. 17 is shifted from the Dm cycle to the Wm cycle. At this time, the microprogram control information (PLHC=3, EMIT=0) is decoded from the WTAG of the Wm cycle and the W-$\mu$-RELEASE-IFCH signal is produced. The produced signal W-$\mu$-RELEASE-IFCH signal is sent to the instruction reading control unit of FIG. 15. The HALT-IFCH-TGR latch of FIG. 23 is deactivated by the W-$\mu$-RELEASE-IFCH signal, whereby the ENB-PROCESS-IFCH latch of FIG. 24 is activated, reading of instructions is enabled, and reading of instructions is started by the signal (A): +IF-REQUEST-VALID signal sent from the instruction reading control unit of FIG. 15. "HALT-IFCH-TGR" (Halt Instruction Fetch Trigger) refers to an indication of a starting point of instruction fetch halt. "W-$\mu$-RELEASE-IFCH" refers to release instruction fetch halt by the microprogram in the W-cycle.

By the processing of the microprogram as explained above, the routine of FIG. 1 is satisfied and the basic instruction re-read operation indicated in FIG. 18 is carried out.

The overall instruction re-read operation of FIG. 18 will be explained next.

First, by the D-μ-HALT-IFCH signal (or the μ-SHORT-RE-IFCH signal) of FC1, the instructions starting from the instruction re-reading instruction are invalidated by deactivating the IWR-VALID and, at the same time, the HALT-IFCH-TGR signal is activated. The HALT-IFCH-TGR signal instructs the halting of reading of instructions, the ENB-PROCESS-IFCH signal is halted, and the reading of instructions is halted.

Next, the CLEAR-IF-PORT-ALL signal is activated, the instruction buffer mechanism is initialized, and the PORT-VALIDs are cleared. Further, due to the clearing of the PORT-VALIDs, the NO-IF-PORT-SEQ-VAL signal is produced and the instruction re-read address is selected. Further, after the PWS is changed, the HALT-IFCH-TGR signal is deactivated by the W-μ-RELEASE-IFCH signal of FC2, whereby a release of the halting of reading of instructions is instructed, the ENB-PROCES-IFCH signal is activated, and an instruction reading request (signal IF-REQUEST-VALID signal) and instruction re-read address are sent to the cache.

An example of instruction re-read operation after producing a subsequent instruction address follows.

The re-reading of instructions at the subsequent instruction address is performed by the LCTL instruction. Among the timing charts of FIG. 18 to FIG. 20, FIG. 19 shows the processing of this example.

In response to the LCTL instruction, the instructions are re-read in accordance with the routine of FIG. 1. The startup of the microprogram of step S1 in the instruction re-read operation at the subsequent instruction address, the halting of the reading of instructions at step S2, and the starting of the reading of instructions of step S4 are performed in the same way as explained in the basic instruction re-reading operation. Only the setting of the instruction read address of step S3 differs.

Figure 19:
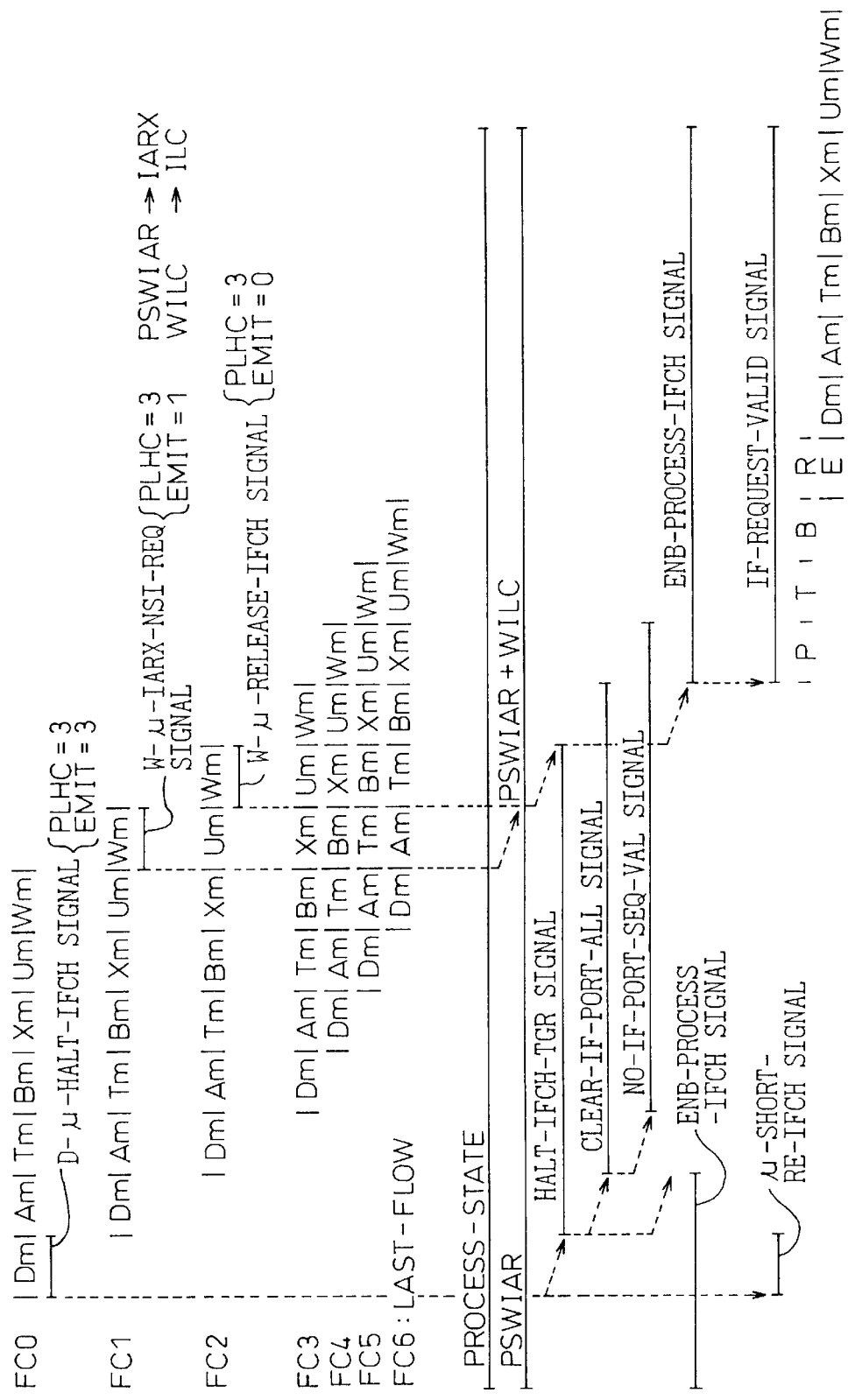
FIG. 19 is a timing chart of the instruction re-read operation by a subsequent instruction address of the instruction processing circuit of FIG. 14.

In the same way as the above basic instruction reread operation, the microprogram is started up at step S1 and the halting of the reading of instructions of step S2 is performed by the FC0 of FIG. 19.

The microprogram control information (PLHC=3, EMIT=1) of FC1 read from the MCS of FIG. 17 is shifted from the Dm cycle to the Wm cycle. At that time, the microprogram control information (PLHC=3, EMIT=0) is decoded from the WTAG of the Wm cycle and the W-μ-IARX-NSI-REQ signal is produced. The produced W-μ-IARX-NSI-REQ signal is sent to the instruction re-read address production unit and set in the IARX-NIS-TGR latch of FIG. 29. "W-μ-IARX-NSI-REQ" refers to an indication to create the PSWIAR+WILC to the IARX by the microprogram in the W-cycle.

At this time, the PSWIAR (self instruction address) from PSW and the W-ILC (self instruction length) obtained by decoding the W-OPC are sent to the instruction re-read address production unit of FIG. 15 at all times during execution of instructions. When the IARX-NIS-TGR latch is activated, PSWIAR is held in the IARX. Moreover, W-ILC is input to the IARX-ILC while the IARX-NSI-TGR latch is activated. For the instruction re-read address, the address (subsequent instruction address) obtained by adding PSWIAR and W-ILC is calculated.

Next, the starting of reading of instructions of step S4 of FIG. 1 is performed by the FC2 of FIG. 19 in the same way as explained for the above basic instruction re-read operation.

By the processing of the microprogram as explained above, the routine of FIG. 1 is satisfied and the basic instruction re-read operation indicated in FIG. 19 is carried out.

First, an explanation will be made of the overall instruction re-read operation of FIG. 19.

First, at the FC0, the invalid instruction IWR-VALID is deactivated by the D-μ-HALT-IFCH signal, the HALT-IFCH-TRG signal is activated to halt the reading of instructions, the instruction buffers are initialized, the PORT-VALIDs are cleared, and the instruction re-read address is selected. The instruction re-read address is made the subsequent instruction address (PSWIAR+ILC) by the W-μ-IARX-NSI-REQ signal of FC1 and the HALT-IFCH-TGR signal is deactivated by the W-μ-RELEASE-IFCH signal of FC2 so as to instruct the release of the halting of the reading of instructions, the ENB-PROCESS-IFCH signal is activated, and instruction reading request (IF-REQUEST-VALID signal) and the instruction re-read address (subsequent instruction address) are sent to the cache. "W-μ-RELEASE-IFCH" refers to release of instruction fetch halt by the microprogram when in the W-cycle.

An example of an instruction re-read operation influenced by the state of the CPU in Interrupt processing follows.

Figure 20:
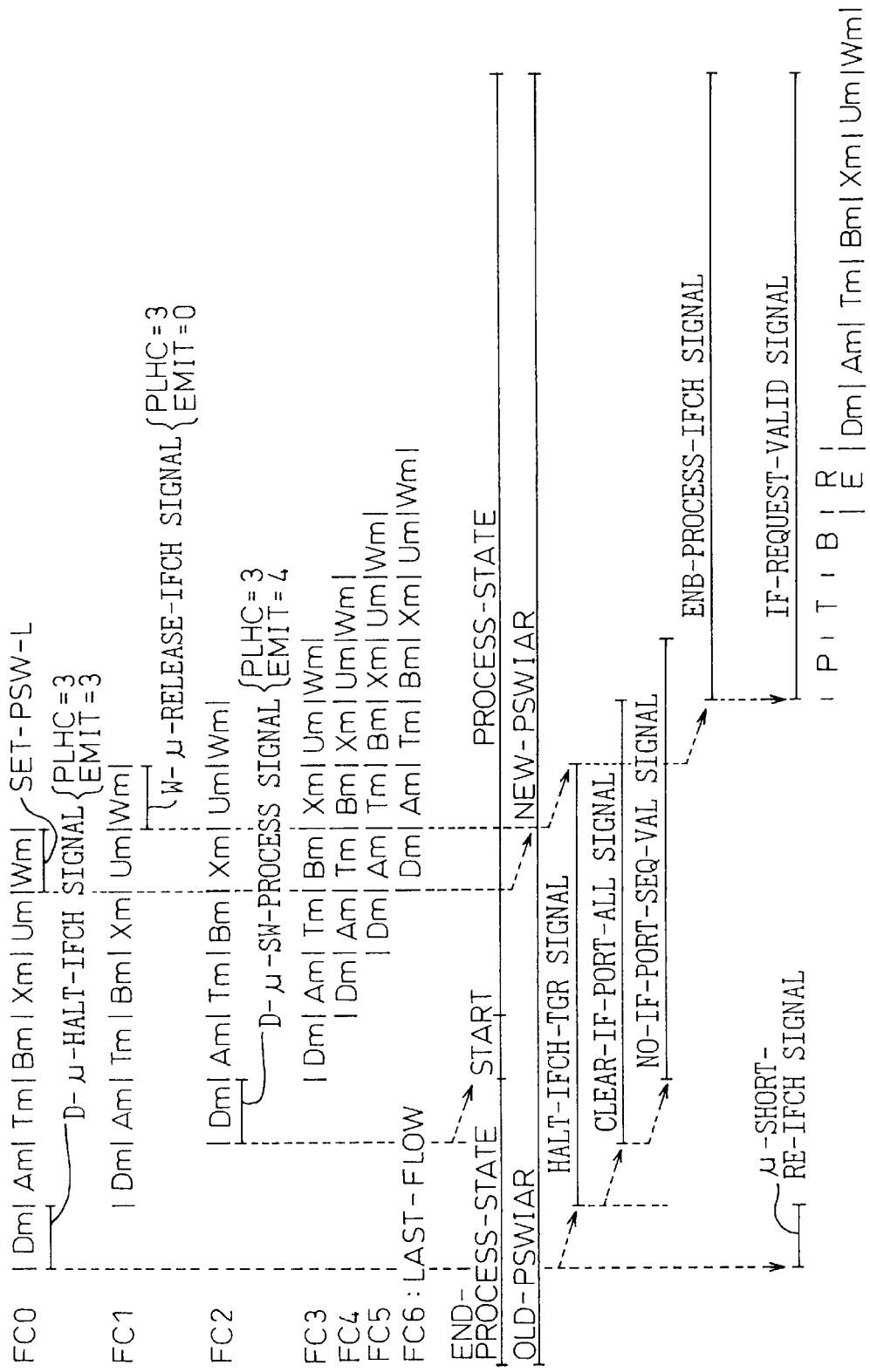
FIG. 20 is a timing chart of an interrupt processing operation of the instruction processing circuit of FIG. 14.

Among the timing charts of FIG. 18 to FIG. 20, FIG. 20 shows the processing of this example.

In an instruction re-read operation influenced by the state of the CPU in interrupt processing, the instruction re-read operation is performed in accordance with the routine of FIG. 1. Further, the startup of the microprogram of step S1 in the instruction re-read operation influenced by the state of the CPU, the halting of reading of instructions of step S2, the setting of the instruction read address of step S3, and the starting of reading of instructions of step S4 are performed by the same processing as explained in the above basic instruction re-read operation. When starting the reading of instructions, however, efforts are made so that the instructions start to be read faster by the microprogram.

In the same way as the above basic instruction reread operation, the microprogram is started up step S1, the halting of the reading of instructions of step S2 and the setting of instruction read addresses of step S3 are performed by the FC0 and the starting of reading of instructions of step S4 is performed by the FC1.

Next, microprogram control information (PLHC=3, EMIT=4) of FC2 read from the MCS of FIG. 17 is shifted from the Dm cycle to the Wm cycle. At this time, the microprogram control information (PLHC=3, EMIT=4) is decoded from, the DTAG of the Dm cycle and the D-μ-SW-PROCESS signal is produced and sent to the process control unit of FIG. 15.

Figure 33:
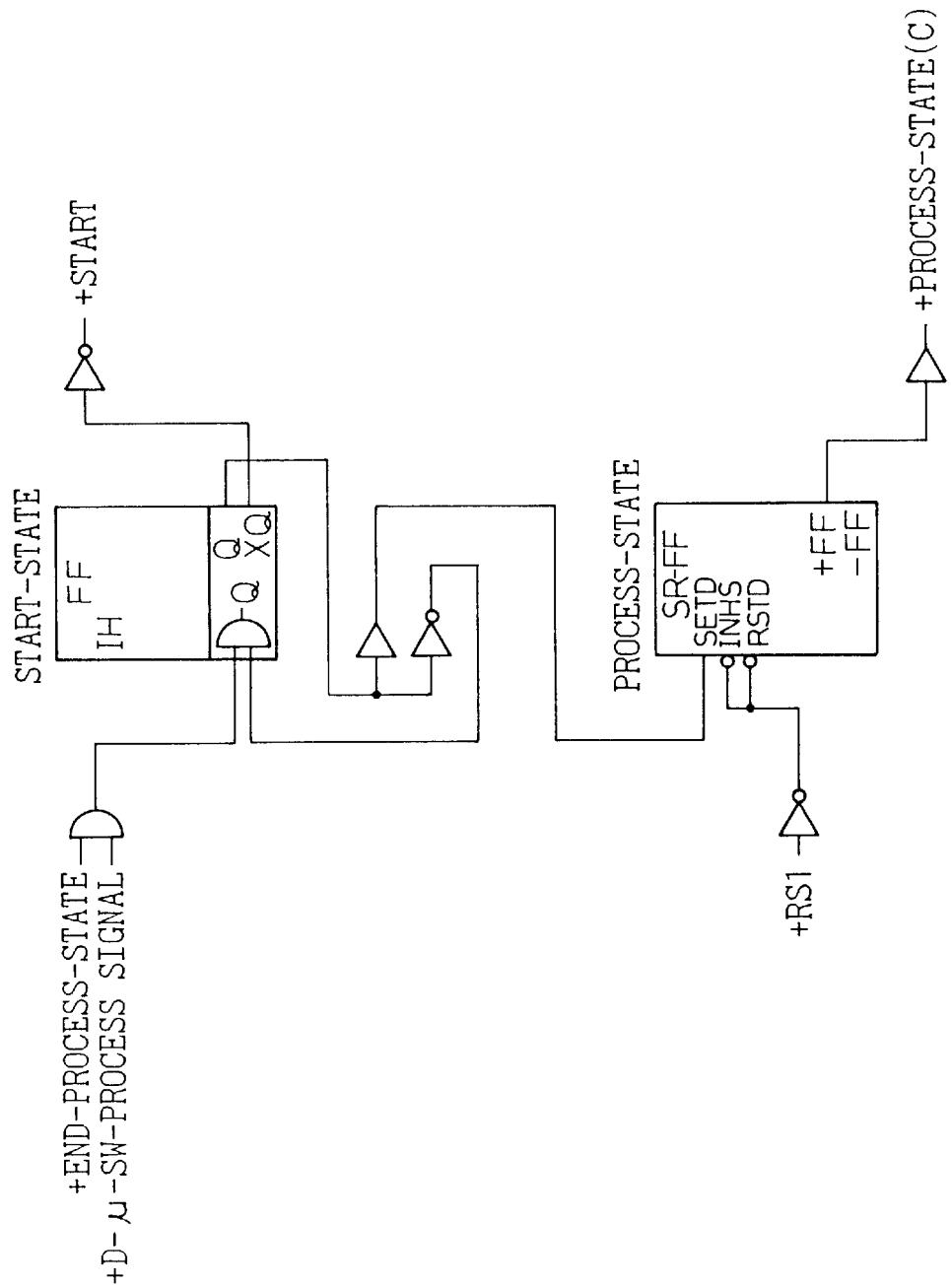
FIG. 33 is a view of the hardware configuration of a process control unit employed in the instruction processing circuit of FIG. 14.

In the process control unit, as shown in FIG. 33, by the signal of the AND of the END-PROCESS-STATE and D-μ-SW-PROCESS signal, the state of the CPU is changed from an END-PROCESS-STATE to START and PROCESS-STATE, the (C): PROCESS-STATE signal of FIG. 15 is sent to the instruction reading control unit, and the ENB-PROCESS-IFCH latch is activated at the next cycle when the HALT-IFCH-TGR signal of FIG. 24 is deactivated. At that cycle, the (A): IF-REQUEST-VALID signal of FIG. 15 is sent from the instruction reading control unit to the cache and the re-reading of instructions is started.

Note that if the re-reading of instructions is started in multiple cycles such as processing of a microprogram for an interrupt, as shown in FIG. 34, there are sometimes cases where there is a shift in cycles from P to T, B, and R and the instruction reading data is read quickly to the instruction buffers. In such cases, the instructions cannot be loaded in the instruction execution control unit until an ongoing instruction is executed and the Dm cycle of the last cycle becomes empty. "P" refers to a state for issuing an instruction address; "T" refers to a state for modifying and searching an instruction address from the TL the TAG; "B" refers to a state for reading an instruction from a modified and searched instruction address; and "R" refers to a state in which a read instruction is being returned.

In the Dm cycle of FIG. 17, a signal (E): MF-LAST-D signal indicating the last cycle of the microprogram instructions is sent to the instruction reading control unit of FIG. 15 and, as indicated in FIG. 35, a next instruction request signal (F): NSI-REQUEST is sent from the instruction reading control unit of FIG. 15 to the IWRs, whereby the loading of instructions from the IBUFFERs to the IWRs is controlled.

By the processing of the microprogram as explained above, the routine of FIG. 1 is satisfied and the basic instruction re-read operation indicated in FIG. 20 is carried out.

The overall instruction re-read operation of FIG. 20 will be explained next.

First, at the FC0, by the D-$\mu$-HALT-IFCH signal, an invalid instruction IWR-VALID is deactivated, the HALT-IFCH-TGR signal is activated to halt the reading of instructions, the instruction buffers are initialized, the PORT-VALIDs are cleared, and the instruction re-read address is selected. The state is changed from the ENDPROCESS-STATE through the START-STATE to the PROCESS-PROCESS-STATE to enable the instruction reading operation by the D-$\mu$-SW-PROCESS signal of FC2 and the HALT-IFCH-TGR signal is deactivated by the W-$\mu$-RELEASE-IFCH signal of FC1 to instruct the release of the half of the reading of instructions, the ENB-PROCESS-IFCH signal is activated, and the instruction reading request (IF-REQUEST-VALID signal) and instruction re-read address are sent to the cache.

The configuration of the hardware of the instruction processing circuit of FIG. 21 to FIG. 33 and FIG. 35 will be further explained next.

Figure 21:
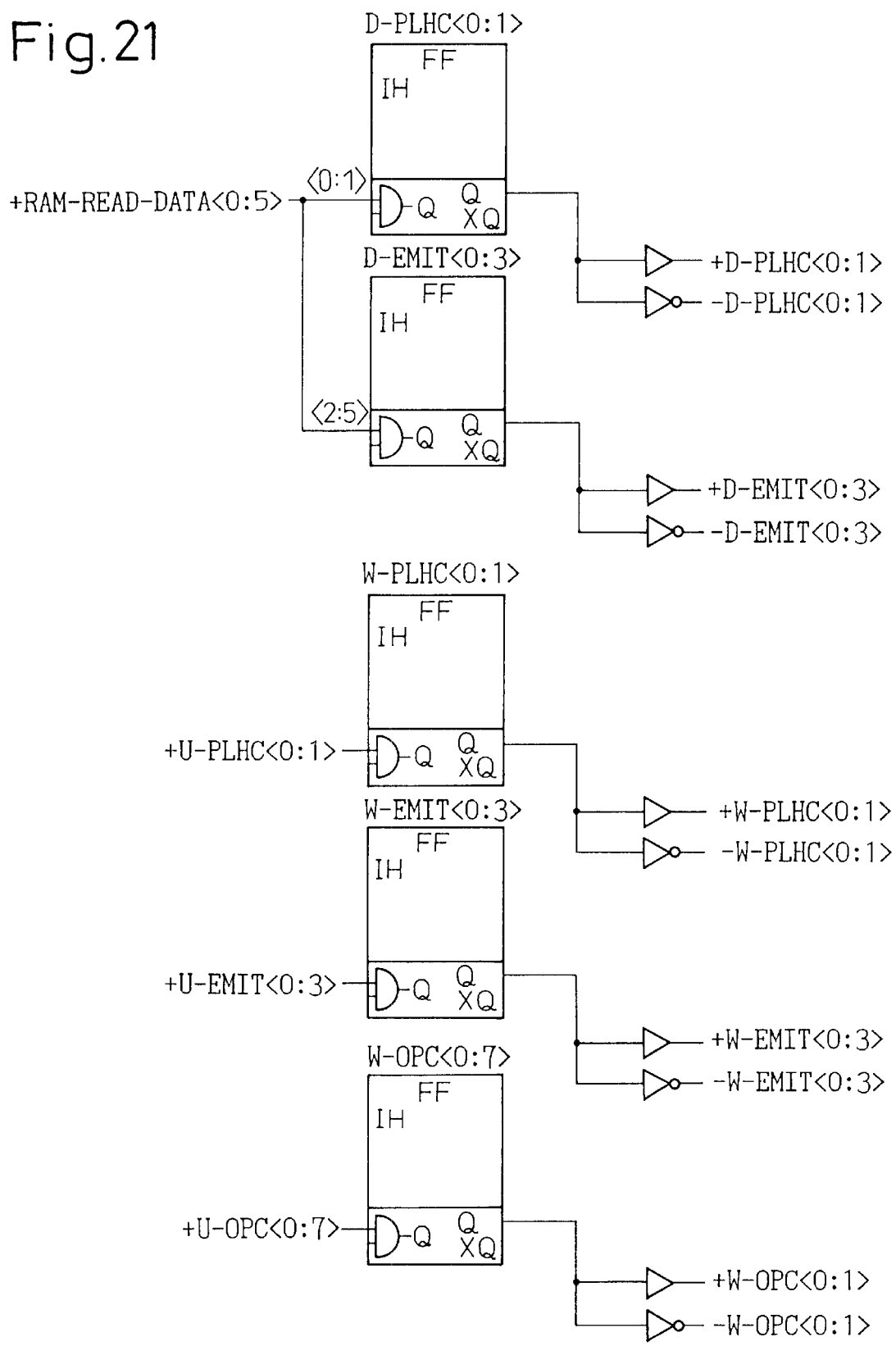
FIG. 21 is a view of the hardware configuration (part 1) of a DTAG and WTAG employed in the instruction processing circuit of FIG. 14.

FIG. 21 and FIG. 22 show detailed examples of the D-TAG and W-TAG in the instruction execution control unit of FIG. 15. FIG. 21 shows microprogram control information (PLHC, EMIT) contained in the D-TAG and WTAG. By decoding the PLHC and EMIT of the microprogram control information as in FIG. 22, the control signals employed in the instruction re-read processing are produced.

The control signals employed in instruction re-read processing and microprogram control information are shown below.

1. D-$\mu$-HALT-IFCH signal (PLHC=3, EMIT=3)
2. W-$\mu$-RELEASE-IFC signal (PLHC=3, EMIT=0)
3. D-$\mu$-SW-PROCESS signal (PLHC=3, EMIT=4)
4. W-$\mu$-IARX-NSI-REQ signal (PLHC=3, EMIT=1)

Fundamentally, the instruction re-read processing is performed by halting the fetching of instructions by the D-$\mu$-HALT-IFCH signal (PLHC=3, EMIT=3) and releasing the halting of the fetching of instructions by the W-$\mu$RELEASE-IFC signal (PLHC=3, EMIT=0) after the change of the PSW. The D-$\mu$-SW-PROCESS signal (PLHC=3, EMIT=4) is used as a signal for requesting a change in state in instruction re-read processing at the time of interrupt processing. The W-$\mu$-IARX-NSI-REQ signal (PLHC=3, EMIT=1) is used as a signal for requesting production of the subsequent instruction address in the LCTL instruction.

Further, the W-OPC of FIG. 21 is the W-cycle operation code. By decoding the W-OPC at FIG. 22, the W-ILC (self instruction length) used at the time of production of the subsequent instruction address is produced.

FIG. 23 to FIG. 28 show a detailed example of the instruction reading control unit shown in FIG. 15. The D-$\mu$-HALT-IFCH signal (PLHC=3, EMIT=3) instructed by the microprogram control information sets the latch of the HALT-IFCH-TGR of FIG. 23 or invalidates the instructions in the IWR0, IWR1, and IWR2 present after the microprogram instructions for executing the instruction re-read processing by deactivating the latch of the IWR1-VALID and IWR2-VALID or IWR2-VALID by the $\mu$-SHORT-RE-IFCH signal of FIG. 28 (=D-$\mu$-HALT-IFCH signal).

The HALT-IFCH-TGR signal of FIG. 23 set by the D-$\mu$-HALT-IFCH signal (PLHC=3, EMIT=3) is a signal for halting the reading of instructions. The HALT-IFCH-TGR signal deactivates the latch of ENB-PROCESS-IFCH of FIG. 24 indicating that reading of instructions is enabled and halts the instruction reading request (IF-REQUEST-VALID). Next, the CLEAR-IF-PORT-ALL signal of FIG. 23 clears the NSICA to NSICC of FIGS. 25 to 27 indicating the states of the instruction buffers and the locations of the instruction fetch data and the PORT-VALID-A/B/C of FIG. 24 indicating the validity of the instruction fetch pipelines (3 systems: A/B/C) for initialization of the instruction fetch.

Figure 28:
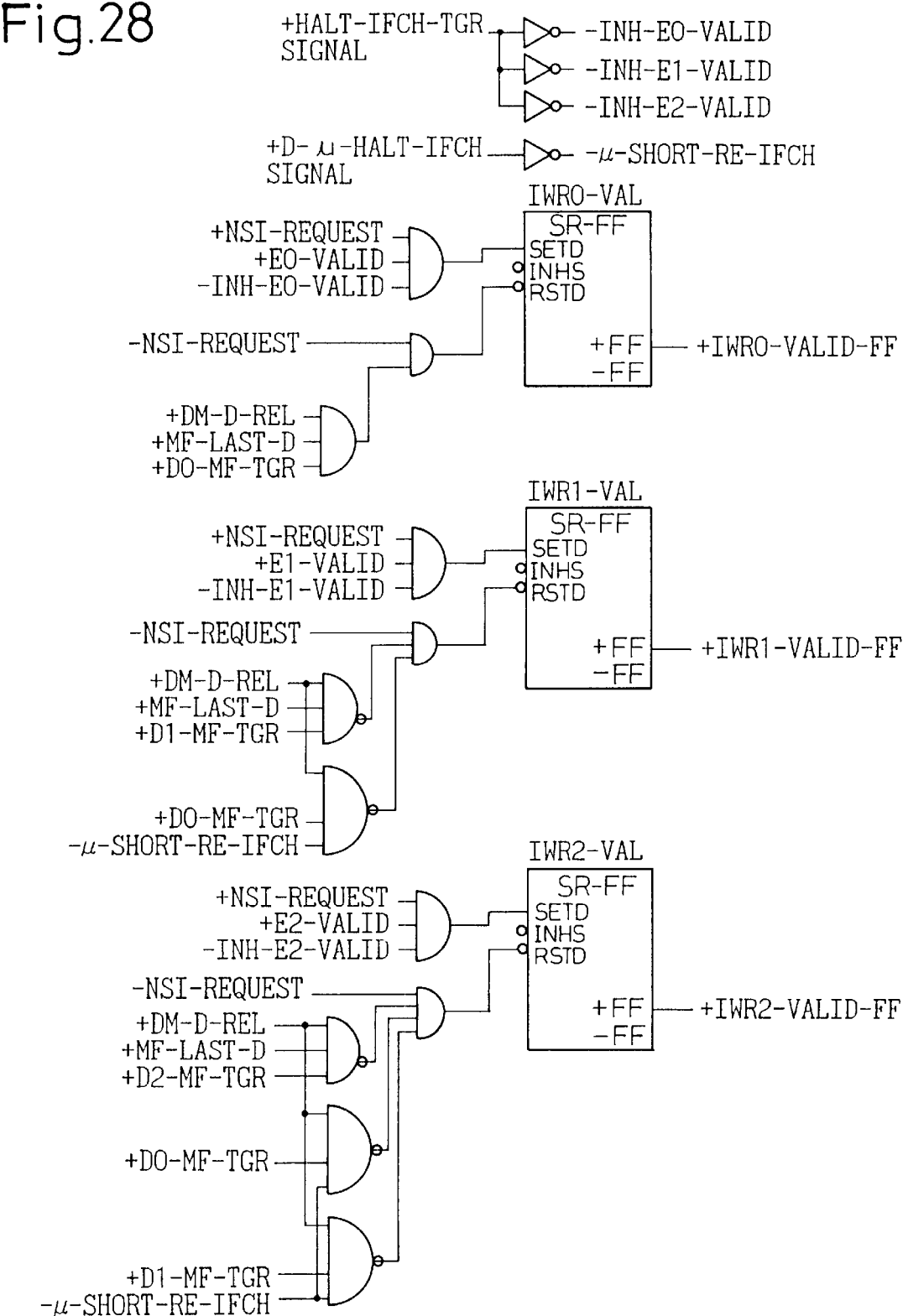
FIG. 28 is a view of the hardware configuration (part 6) of an instruction reading control unit employed in the instruction processing circuit of FIG. 14.
Figure 32:
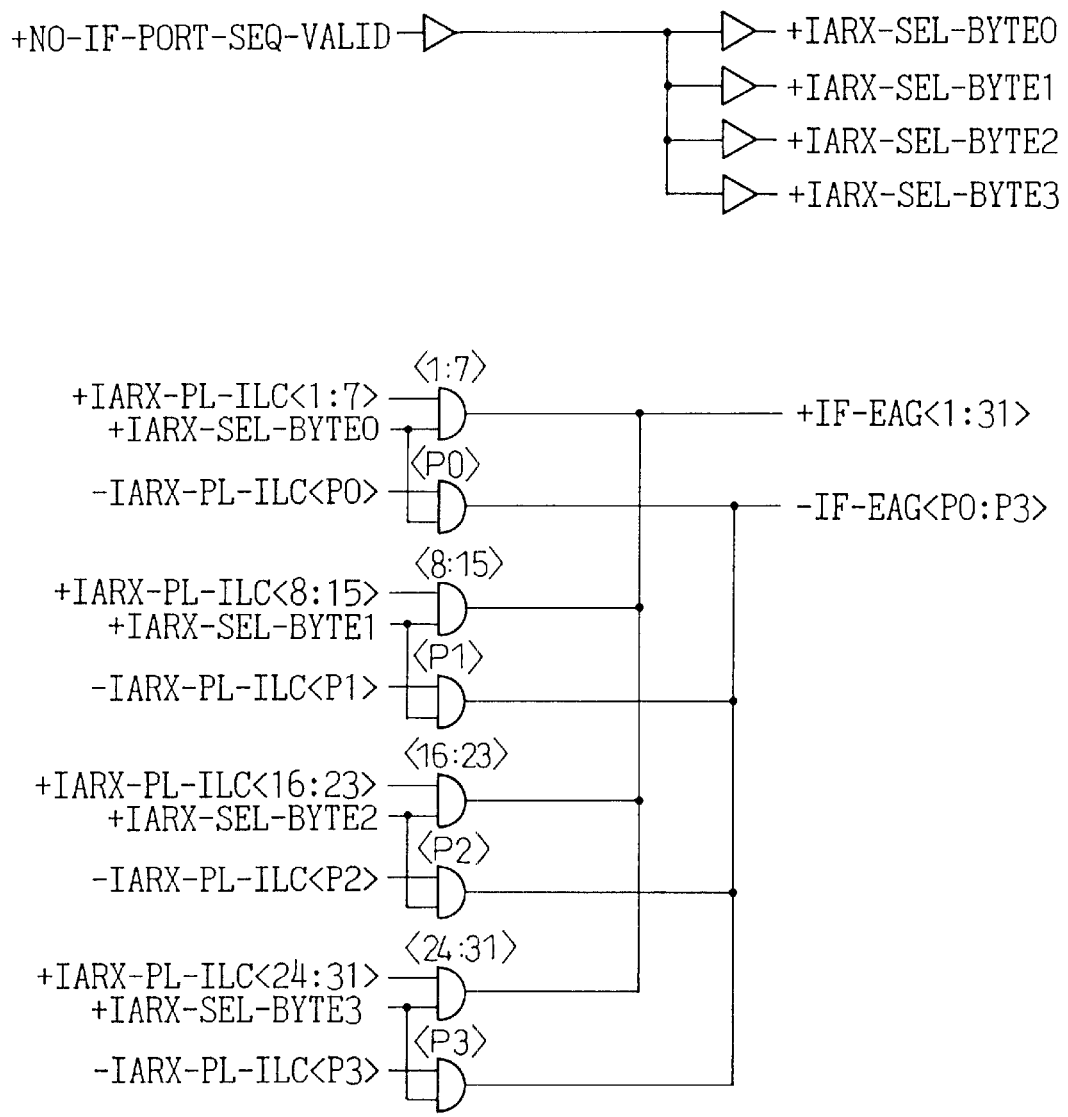
FIG. 32 is a view of the hardware configuration of an instruction re-read address selection circuit employed in the instruction processing circuit of FIG. 14.

The cleared PORT-VALID-A/B/C are used to produce a NO-IF-PORT-SEQ-VALID signal. As shown in FIG. 24 and FIG. 32, an instruction reading request (IF-REQUEST-VALID) and an instruction re-read address are selected. Further, when halting the instruction fetch, to prevent VALID latches of IWRs from being unnecessarily set due to requests for instruction fetches already made, signals for setting IWR-VALID latches of FIG. 28 are inhibited by the INH-E-VALID signal (=HALT-IFCH-TGR signal).

After the PSW is updated, by the W-$\mu$-RELEASE-IFC signal (PLHC=3, EMIT=0) instructed by the microprogram control information, the latch of the HALT-IFCH-TGR of FIG. 23 is reset and the halting of the reading of instructions is released so as to start the reading of instructions and enable the instruction re-reading processing.

Further, the NSI-REQUEST signal of FIG. 35 is a signal for control of the loading of instructions at the time of instruction re-read processing. This is produced by the signals showing the instructions of the IWRs are valid (IWR0-VALID, IWR1-VALID, and IWR2-VALID), signals showing that the instructions of the IWRs are a series of cycle instructions (D0-MF-TGR, D1-MF-TRG, and D2-MF-TGR), a signal showing the last cycle in the Dm cycle of the microprogram instructions being executed (MF-LAST-D), and a Dm cycle release signal (Dm-MF-REL).

FIG. 29 to FIG. 32 show detailed examples of the instruction re-read address production unit.

Figure 29:
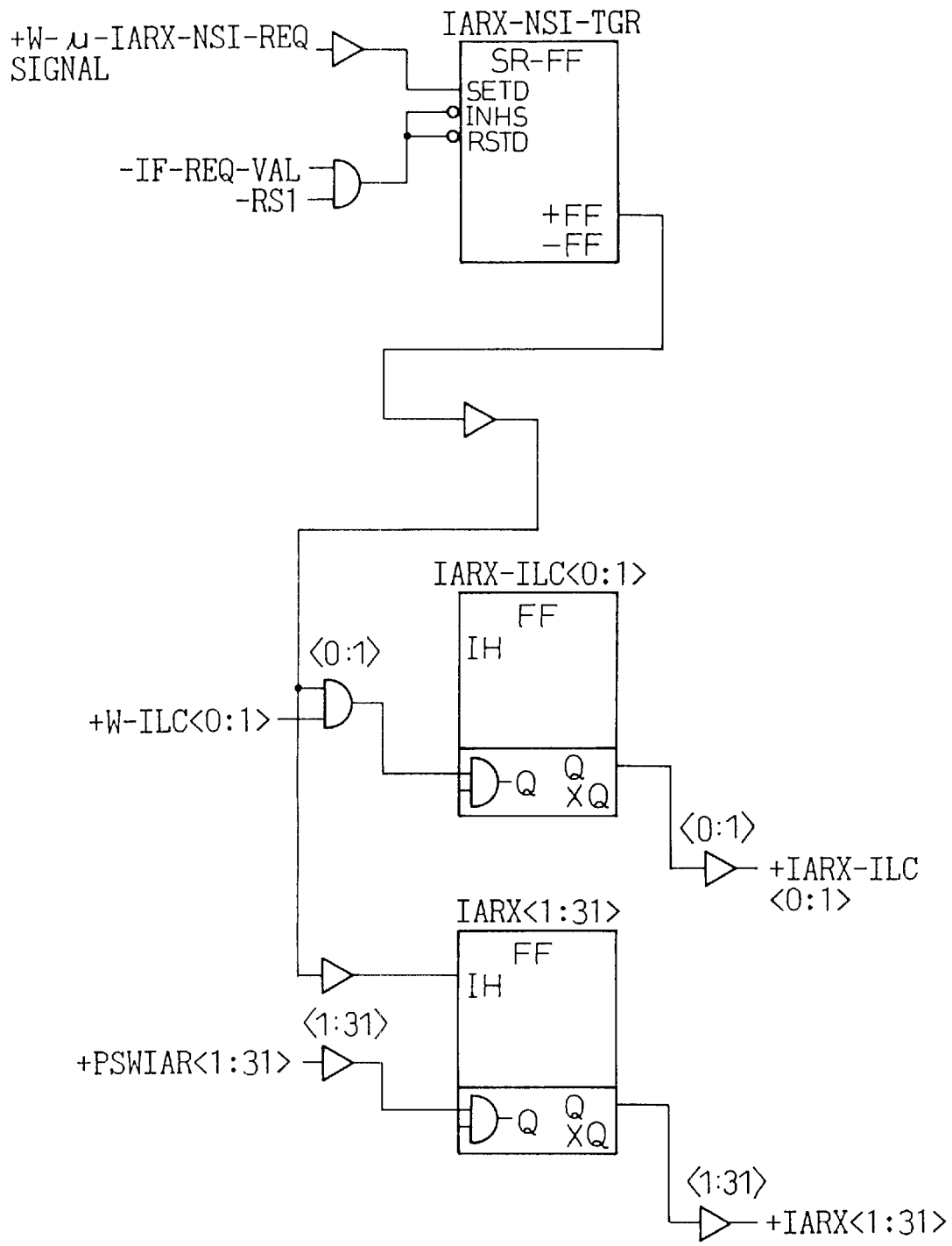
FIG. 29 is a view of the hardware configuration (part 1) of the instruction re-read address production circuit employed in the instruction processing circuit of FIG. 14.
Figure 30:
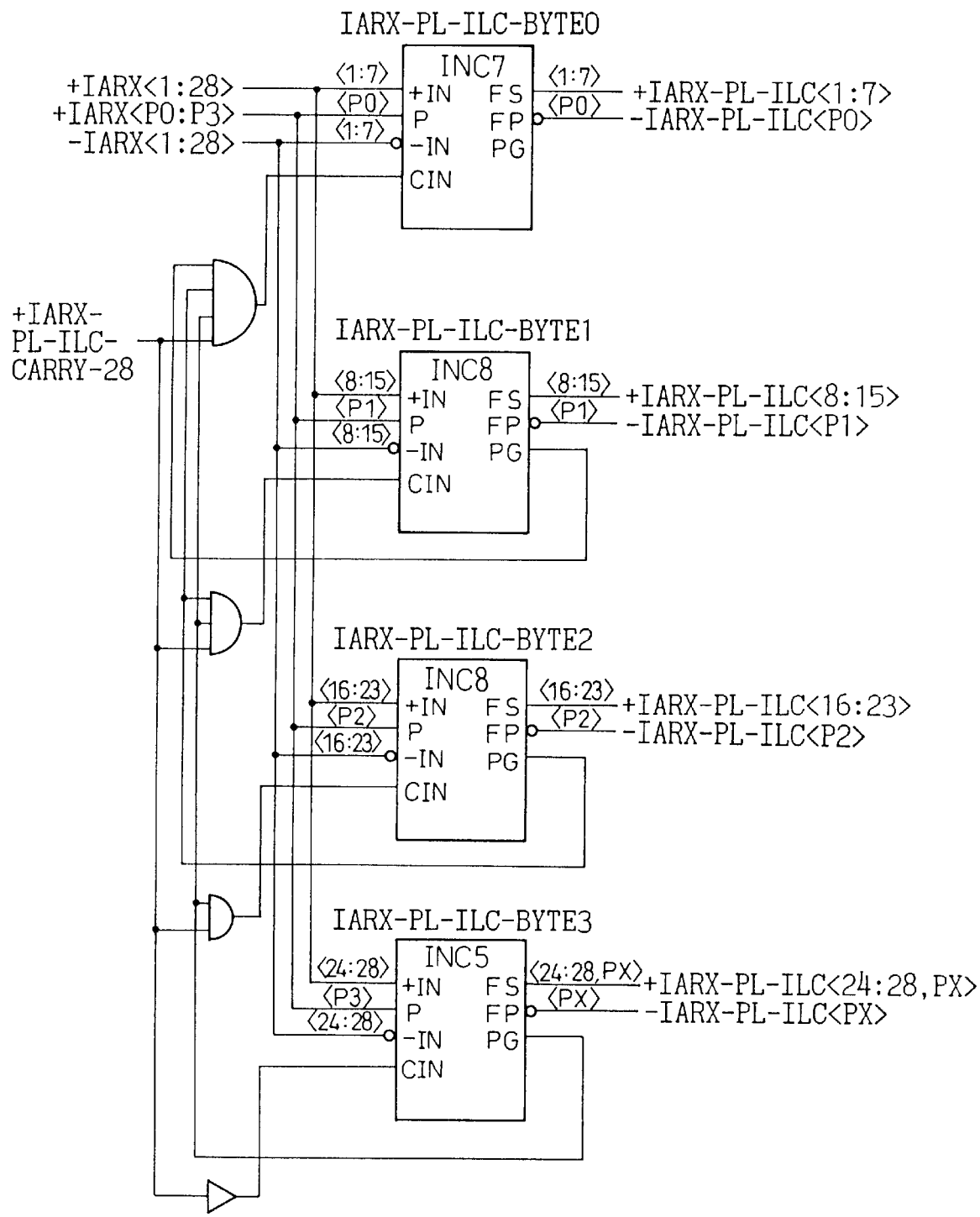
FIG. 30 is a view of the hardware configuration (part 2) of the instruction re-read address production circuit employed in the instruction processing circuit of FIG. 14.
Figure 31:
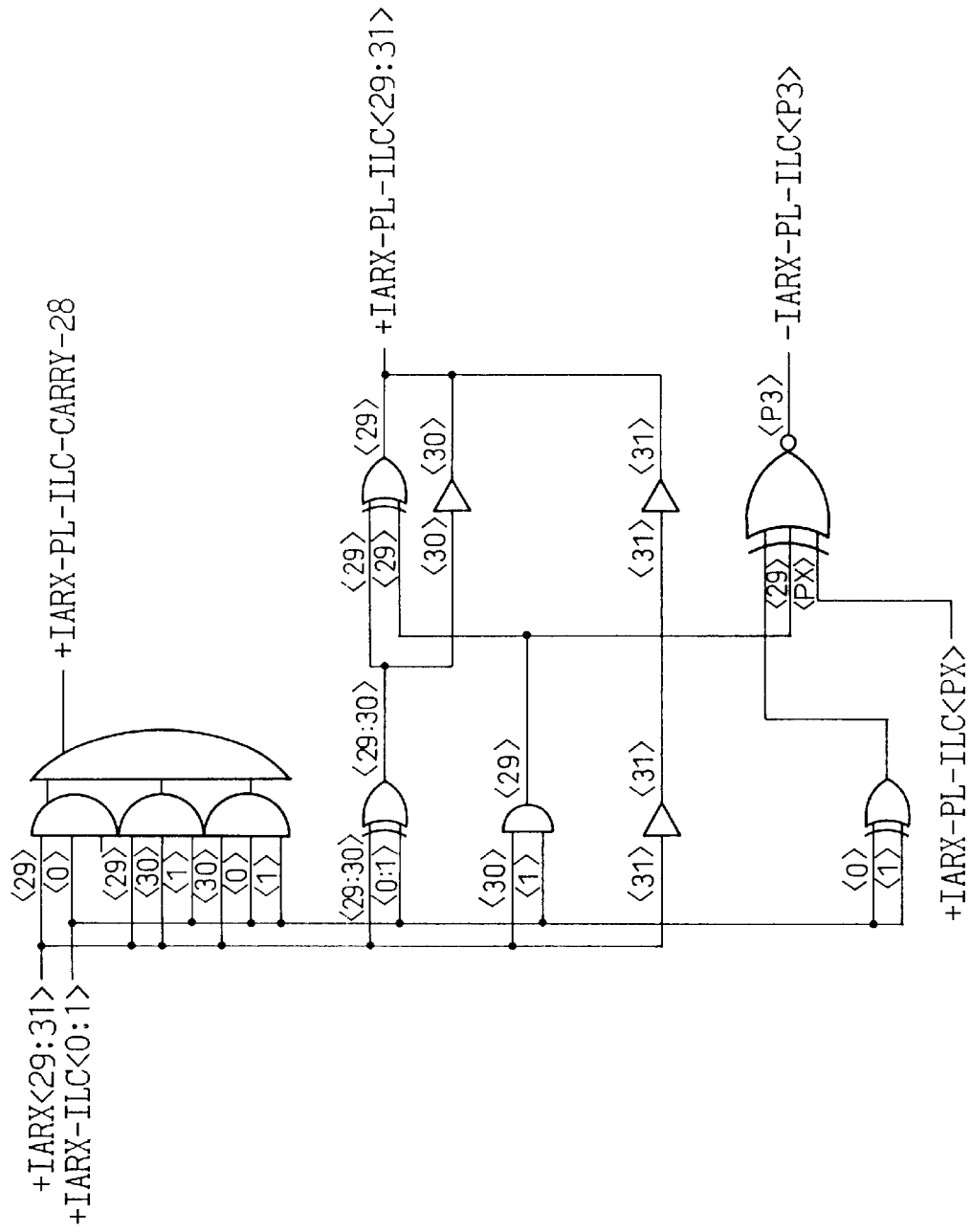
FIG. 31 is a view of the hardware configuration (part 3) of the instruction re-read address production circuit employed in the instruction processing circuit of FIG. 14.

FIG. 29 to FIG. 31 show the circuit for producing the instruction re-read address. Normally, an instruction re-read address is a value of PSWIAR. Since, however, there are cases of instruction re-reading processing at a subsequent instruction address as in the instruction re-reading processing at the time of an LCTL instruction, as shown in FIG. 29 to FIG. 31, an IARX (self instruction address) and ILC (self instruction length) and adder are provided and the instruction reread address is selected by the latch of the IARX- NSI-TGR controlled by the W-µ-IARX-NSI-TGR signal (PLHC=3, EMIT=0) so as to produce the PSWIAR (PSWIAR+O length) and subsequent instruction address (PSWIAR+ILC).

When the latch of IARX-NSI-TGR is deactivated, PSWIAR is produced and used as the instruction re-read address as it is. When the latch of the IARX-NSI-TGR is activated, the subsequent instruction address is produced as the instruction re-read address.

FIG. 32 shows a selection circuit for an instruction re-read address. When the PORT-VALIDs (A/B/C) of FIG. 24 are cleared, the instruction re-read address produced by FIG. 29 to FIG. 31 is selected and the instruction address is sent to the cache of FIG. 15.

FIG. 33 shows a detailed example of the process control unit (FIG. 15).

The instruction re-reading processing at the time of interrupt processing is performed at the END-PROCESS-STATE, so the END-PROCESS-IFCH indicating that reading of instructions is enabled is deactivated and instruction reading requests (IF-REQUEST-VALID) are not able to be issued. Therefore, due to the D-µ-SW-PROCESS signal I (PLHC=3, EMIT=4), the state is changed from the ENDPROCESS-STATE through the START-STATE to the PROCESS-STATE and fetching of instructions is enabled.

The timing chart of FIG. 36 will be used to explain the present invention in comparison with the related art. FIG. 36 shows the execution of the instruction reread processing by microprogram processing, the halting of reading of instructions, and the release of the halting of the reading of instructions in the present invention and related art.

At this time, the starting of reading of instructions according to the present invention can be made earlier than the starting of reading of instructions according to the related art by the amount of clocks of the difference shown in the figure and therefore instructions indicated by the instruction re-read address can be loaded earlier into the instruction execution control unit. Further, even as the series of cycles between the cycle instructing the release of the halt of the reading of instructions and the last cycle in the present invention increases, the required clocks relating to the instruction reading processing from the reading of instructions to the loading of instructions into the instruction execution pipeline remains secured. Thus, even if the number of clocks of the instruction reading processing increases, if the instruction fetching processing would be completed within the secured number of clocks, instructions can be loaded into the instruction execution control unit early in the next timing of the Dm cycle of the last cycle.

According to the present invention, it is possible to provide an instruction processing unit provided with a queue stack for processing for execution of instructions and enabling microprogram control, to control the rereading of instructions by a microprogram, and to increase the speed of the instruction re-reading operation.

What is claimed is:

1. An instruction processing apparatus, comprising:

a pipeline instruction execution unit fetching and executing an instruction from a cache memory;

a pipeline instruction execution control unit independent of said pipeline instruction execution unit controlling of the pipeline instruction execution unit by a microprogram read from a microprogram storage;

a halt unit halting a request for reading a subsequent instructions, based on halt-data of the microprogram at the time of an instruction re-reading operation in said pipeline instruction execution unit, in which at the time a state of the instruction processing apparatus is changed in an execution of a sequence of an instruction, an instruction re-reading operation which reads another sequence of instruction is executed; and a control unit releasing the halting by said halt unit according to the release-data of the microprogram which controls the instruction re-reading operation while the pipeline instruction execution unit is executing.

2. The instruction processing apparatus according to claim 1, wherein said microprogram contains microprogram control information for instructing the creation of a subsequent instruction and thereby enabling the microprogram executing and the microprogram instructing re-reading processing to be executed simultaneously, and enabling the halting of a request for reading a subsequent instruction and releasing of the halting.

3. The instruction processing apparatus according to claim 1, further comprising a unit performing instruction re-reading processing in advance at the instruction of the microprogram when an instruction reread operation is finalized by multiple series of cycles of the microprogram.

4. The instruction processing apparatus according to claim 1, further comprising a unit executing an instruction fetch at said instruction re-read process so as to enable advance instruction reading processing by the microprogram at the time of interrupt processing.

* * * * *

UNITED STATES PATENT AND TRADEMARK OFFICE
CERTIFICATE OF CORRECTION

PATENT NO. : 6,754,814 B1
DATED : June 22, 2004
INVENTOR(S) : Hiroki Narita et al.

It is certified that error appears in the above-identified patent and that said Letters Patent is hereby corrected as shown below:

Column 16,
Line 18, change "instructions" to -- instruction --.

Signed and Sealed this

Twenty-eighth Day of September, 2004

JON W. DUDAS
*Director of the United States Patent and Trademark Office*